United States Patent
Piper et al.

(10) Patent No.: US 12,282,358 B1
(45) Date of Patent: Apr. 22, 2025

(54) ENHANCED PORTABLE ELECTRONIC DEVICE CASE STAND SYSTEM

(71) Applicant: Pioneer Square Brands, Inc., High Point, NC (US)

(72) Inventors: Brian Lewis Piper, Seattle, WA (US); Mark Elliott Jones, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/943,749

(22) Filed: Nov. 11, 2024

(51) Int. Cl.
*G06F 1/16* (2006.01)

(52) U.S. Cl.
CPC .......... *G06F 1/1629* (2025.01); *G06F 1/1628* (2013.01); *G06F 1/166* (2013.01)

(58) Field of Classification Search
CPC ...... G06F 1/1628; G06F 1/166; G06F 1/1626; G06F 1/1629
See application file for complete search history.

(56) References Cited

U.S. PATENT DOCUMENTS

| | | | | |
|---|---|---|---|---|
| 6,525,928 B1 * | 2/2003 | Madsen | ................ | G06F 1/1628 |
| | | | | 361/679.56 |
| 7,167,358 B2 * | 1/2007 | Iwasaki | ................ | G06F 1/1626 |
| | | | | 361/679.21 |
| 7,206,198 B2 * | 4/2007 | Wang | ................ | G06F 1/166 |
| | | | | 361/679.55 |
| 7,502,222 B2 * | 3/2009 | Cheng | ................ | G06F 1/1624 |
| | | | | 361/679.06 |
| 8,824,134 B2 * | 9/2014 | Chu | ................ | G06F 1/166 |
| | | | | 361/679.4 |
| 9,335,791 B2 * | 5/2016 | Fontana | ................ | G06F 1/1669 |
| 9,470,358 B2 * | 10/2016 | Le Gette | ................ | F16M 13/04 |
| 9,748,999 B2 * | 8/2017 | Nyholm | ................ | F16M 1/00 |
| 10,031,557 B1 * | 7/2018 | Morrison | ................ | G06F 1/189 |
| 10,310,557 B1 * | 6/2019 | Wu | ................ | G06F 3/0416 |
| 10,372,169 B1 * | 8/2019 | Ferren | ................ | G06F 1/1628 |
| 10,905,211 B2 * | 2/2021 | Nyholm | ................ | G06F 1/1626 |
| 11,184,989 B2 * | 11/2021 | Kang | ................ | G06F 3/039 |
| 11,775,022 B1 * | 10/2023 | Troedson | ................ | G06F 1/1626 |
| | | | | 206/586 |
| 12,197,655 B2 * | 1/2025 | Zhao | ................ | H02J 7/342 |
| 2003/0076302 A1 * | 4/2003 | Langstraat | ................ | G06F 1/169 |
| | | | | 345/161 |
| 2006/0044288 A1 * | 3/2006 | Nakamura | ................ | G06F 3/0338 |
| | | | | 345/179 |
| 2011/0299241 A1 * | 12/2011 | Chen | ................ | G06F 1/1628 |
| | | | | 361/679.55 |

(Continued)

*Primary Examiner* — Nidhi Thaker
(74) *Attorney, Agent, or Firm* — Grandview Law

(57) ABSTRACT

Systems involve a case assembly including a base, a first side extending from the base, and a stand assembly including an elongated member having an elongated cavity, and a base extending from the elongated member. The stand assembly is rotatably coupled with the case assembly so that the stand assembly is rotatable between a first rotational position and a second rotational position so that the elongated cavity is covered by the case assembly when the stand assembly is in the first rotational position, and so that the elongated cavity is at least partially uncovered from the case assembly when the stand assembly is in the second rotational position. Other aspects are described in the claims, drawings, and text forming a part of the present disclosure.

16 Claims, 34 Drawing Sheets

(56) References Cited

U.S. PATENT DOCUMENTS

| | | | |
|---|---|---|---|
| 2012/0243174 A1* | 9/2012 | Lee | G06F 1/1628 |
| | | | 361/679.56 |
| 2013/0342976 A1* | 12/2013 | Chung | G06F 1/166 |
| | | | 248/688 |
| 2015/0055285 A1* | 2/2015 | Zheng | G06F 1/1626 |
| | | | 361/679.26 |
| 2016/0034001 A1* | 2/2016 | Huston | G06F 3/03545 |
| | | | 224/191 |
| 2016/0054756 A1* | 2/2016 | Lan | G06F 1/1688 |
| | | | 348/335 |
| 2019/0212784 A1* | 7/2019 | Oakeson | G06F 1/1669 |
| 2021/0037666 A1* | 2/2021 | Kang | G06F 1/1633 |
| 2023/0099983 A1* | 3/2023 | Kim | G06F 1/1656 |
| | | | 361/679.27 |

* cited by examiner

ENHANCED PORTABLE ELECTRONIC DEVICE CASE STAND SYSTEM

SUMMARY

In one or more aspects a case system for a portable electronic device and a stylus device includes (I) a case assembly including (A) a base, (B) a first side extending from the base, (C) a second side extending from the base, and at least a portion of the second side extending perpendicular to at least a portion of the first side, (D) a third side extending from the base and at least a portion of the third side extending perpendicular to at least a portion of the second side, and (E) a fourth side extending from the base and at least a portion of the fourth side extending perpendicular to at least a portion of the first side; and (II) a stand assembly including (A) an elongated member having an elongated cavity, and (B) a base extending from the elongated member, wherein the stand assembly is rotatably couplable with the case assembly, wherein when the stand assembly is rotatably coupled with the case assembly, the stand assembly is rotatable between at least a first rotational position and a second rotational position, wherein the elongated cavity is covered by the case assembly when the stand assembly is in the first rotational position, and wherein the elongated cavity is at least partially uncovered from the case assembly when the stand assembly is in the second rotational position.

In implementations a first friction is between at least a portion of the case assembly and the stand assembly when the stand assembly is between the first rotational position and the second rotational position, and wherein the first friction resists rotational movement by the stand assembly between the first rotational position and the second rotational position of the stand assembly.

Implementations the first friction is between at least a portion of the elongated member of the stand assembly and at least a portion of the first side of the case assembly.

In implementations the first side of the case assembly includes an elongated recess with opposing first and second sides, wherein the elongated member of the stand assembly has first and second ends, wherein the first end of the elongated member of the stand assembly is rotatably coupled with the first side of the elongated recess of the case assembly, and wherein the first end of the elongated member of the stand assembly is rotatably coupled with the first side of the elongated recess of the case assembly.

In implementations the elongated member of the stand assembly includes first and second pegs extending from the first and second ends of the elongated member, respectively, wherein the first and second sides of the elongated recess includes first and second apertures, respectively, wherein the first peg of the elongated member is rotatably couplable with the first aperture of the first side of the elongated recess, and wherein the second peg of the elongated member is rotatably couplable with the second aperture of the first side of the elongated recess.

In implementations the base of the stand assembly includes first and second flat surface portions, wherein the base of the stand assembly includes an aperture having a perimeter with first and second portions, wherein the first flat surface portion extends from the first and second ends of the elongated member along the elongated member and along the first portion of the perimeter, and wherein the second first flat surface portion extends from the first and second ends of the elongated member along the second portion of the perimeter of the aperture.

In implementations the elongated member includes a plurality of supports that are shaped and positioned in the elongated cavity to couple with the stylus device.

Implementations the plurality of supports are shaped to couple with the stylus device as a non-cylindrical stylus device.

In implementations the plurality of supports include a first type having at least one groove.

In implementations the plurality of supports include a second type having at least one pad.

In implementations the elongated cavity of the elongated member of the stand assembly includes a floor, and wherein the floor includes an indicia.

In implementations the base of the stand assembly extends at an angle greater than zero but less than ninety degrees relative to the base of the case assembly when the stand assembly is in the first rotational position.

Implementations the base of the stand assembly is adjacent to an exterior portion of the base of the case assembly when the stand assembly is in the second rotational position.

In implementations the base, the first side, the second side, the third side, and the fourth side of the case assembly include interior portions to couple with the portable electronic device.

In one or more aspects a case system for a portable electronic computing device includes (I) a case assembly including (A) a base, (B) a first side extending from the base, (C) a second side extending from the base, and at least a portion of the second side extending perpendicular to at least a portion of the first side, (D) a third side extending from the base and at least a portion of the third side extending perpendicular to at least a portion of the second side, and (E) a fourth side extending from the base and at least a portion of the fourth side extending perpendicular to at least a portion of the first side; and (II) a stand assembly including (A) an elongated member having an elongated cavity, and (B) a base extending from the elongated member, wherein the stand assembly is rotatably couplable with the case assembly, wherein when the stand assembly is rotatably coupled with the case assembly, the stand assembly is rotatable between at least a first rotational position and a second rotational position, wherein the elongated cavity is covered by the case assembly when the stand assembly is in the first rotational position, wherein the elongated cavity is at least partially uncovered from the case assembly when the stand assembly is in the second rotational position, and wherein the elongated cavity includes a plurality of supports to couple with the stylus device.

In implementations the base of the stand assembly extends at an angle greater than zero but less than ninety degrees relative to the base of the case assembly when the stand assembly is in the first rotational position.

In implementations the base of the stand assembly is adjacent to an exterior portion of the base of the case assembly when the stand assembly is in the second rotational position.

In one or more aspects a case system for a portable electronic computing device includes (I) a case assembly including (A) a base, (B) a first side extending from the base, (II) a stand assembly including (A) an elongated member having an elongated cavity, and (B) a base extending from the elongated member, wherein the stand assembly is rotatably couplable with the first side of the case assembly, wherein when the stand assembly is rotatably coupled with the first side of the case assembly, the stand assembly is rotatable between at least a first rotational position and a second rotational position, wherein the elongated cavity is covered by the case assembly when the stand assembly is in the first rotational position, wherein the elongated cavity is at least partially uncovered from the case assembly when the stand assembly is in the second rotational position.

In implementations a first friction is between at least a portion of the case assembly and the stand assembly when the stand assembly is between the first rotational position and the second rotational position, and wherein the first friction resists rotational movement by the stand assembly between the first rotational position and the second rotational position of the stand assembly.

In implementations the first side of the case assembly includes an elongated recess with opposing first and second sides, wherein the elongated member of the stand assembly has first and second ends, wherein the first end of the elongated member of the stand assembly is rotatably coupled with the first side of the elongated recess of the case assembly, and wherein the first end of the elongated member of the stand assembly is rotatably coupled with the first side of the elongated recess of the case assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Enhanced Portable Electronic Device Case Stand System, articles of manufacture, compositions of matter for same that may provide context, for instance, in introducing one or more processes and/or devices described herein.

DETAILED DESCRIPTION

Figure 1:
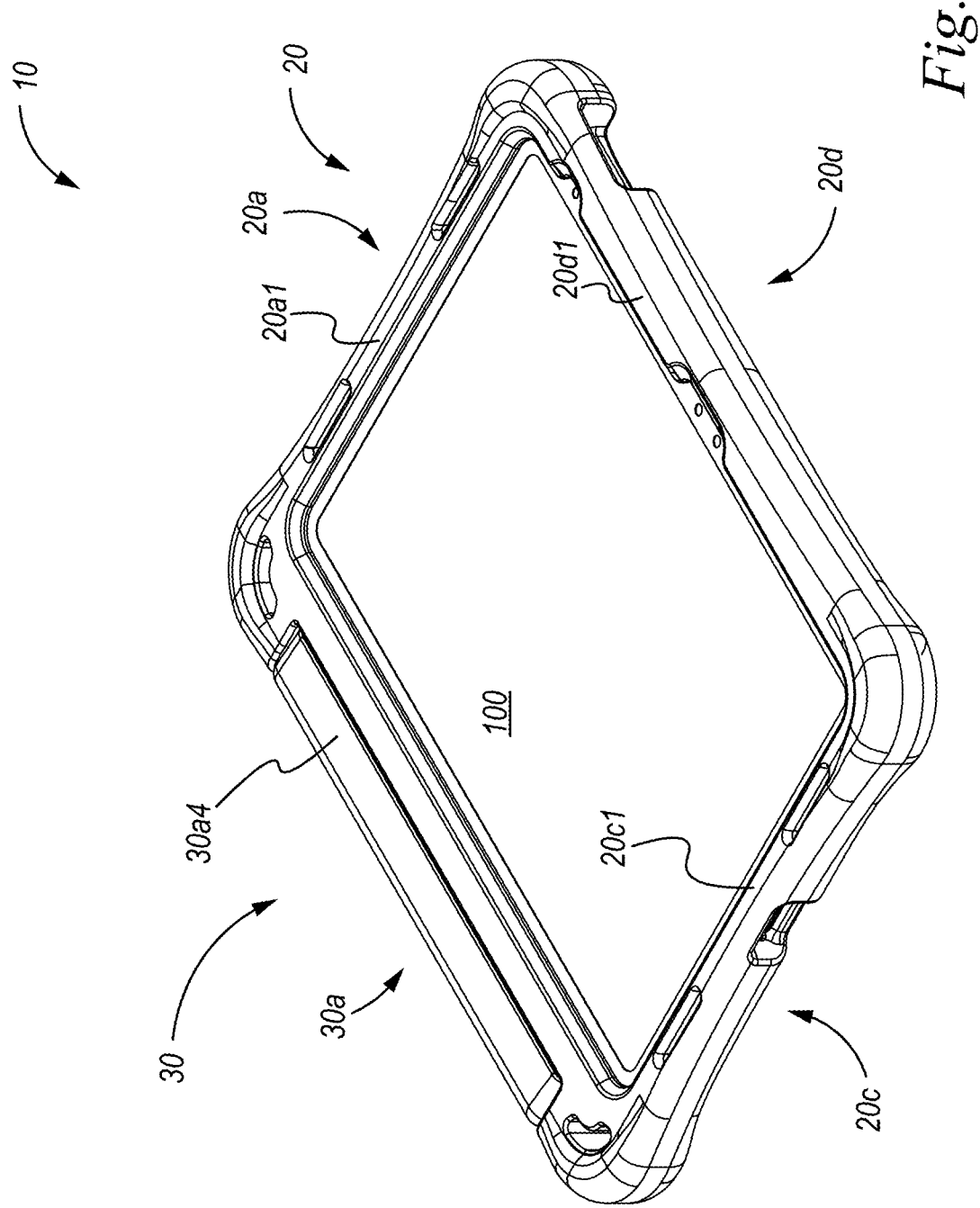
FIG. 1 is a top perspective view of a portable electronic computing device case system containing a portable electronic computing device in closed configuration.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of portable electronic computing device case system 10 containing portable electronic computing device 100 in closed configuration. In implementations portable electronic computing device case system 10 includes case assembly 20 and stand assembly 30.

Figure 2:
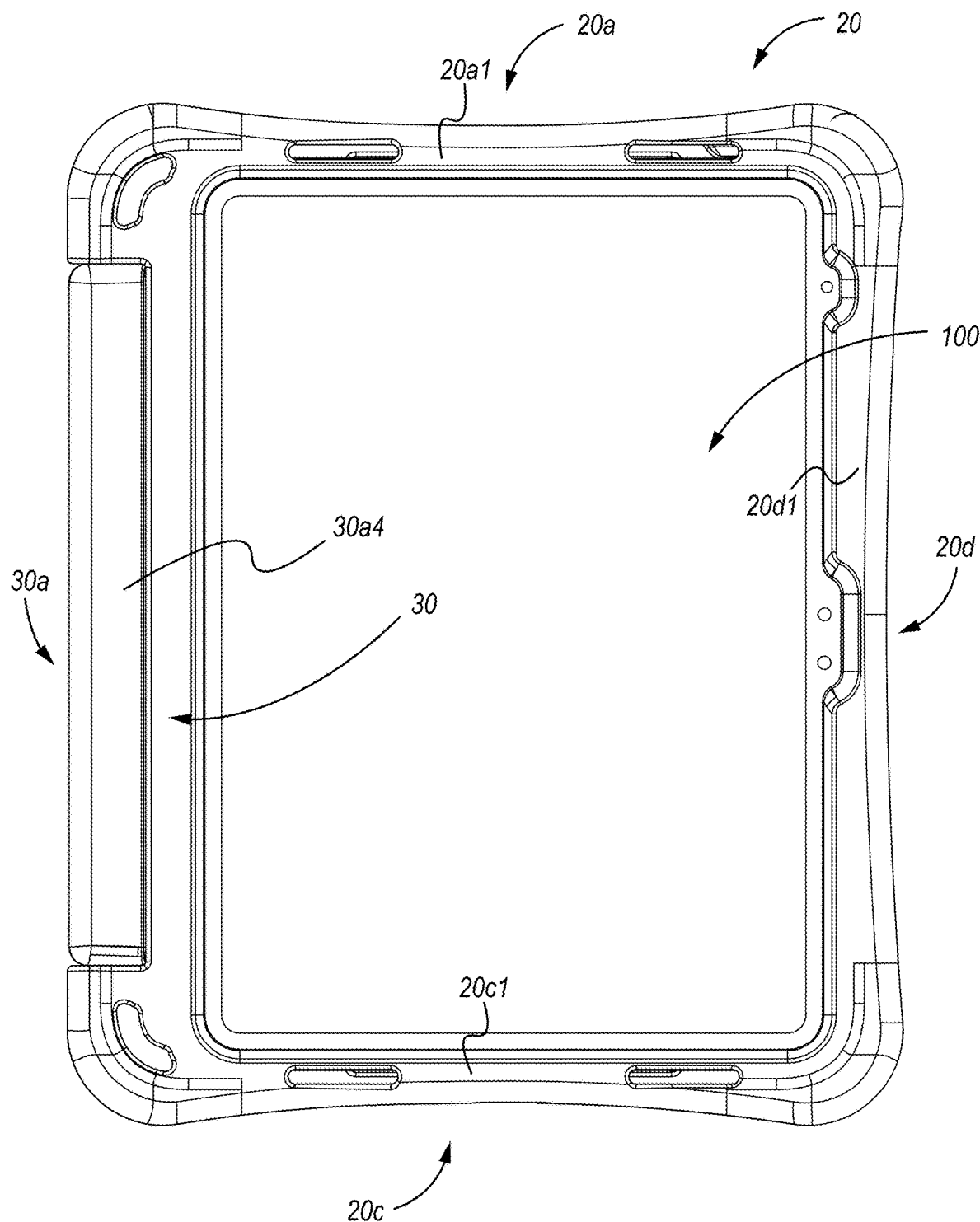
FIG. 2 a top plan view of the portable electronic computing device case system of FIG. 1 containing the portable electronic computing device of FIG. 1 in closed configuration.

Turning to FIG. 2, depicted therein a top plan view of portable electronic computing device case system 10 containing portable electronic computing device 100 in closed configuration.

Figure 3:
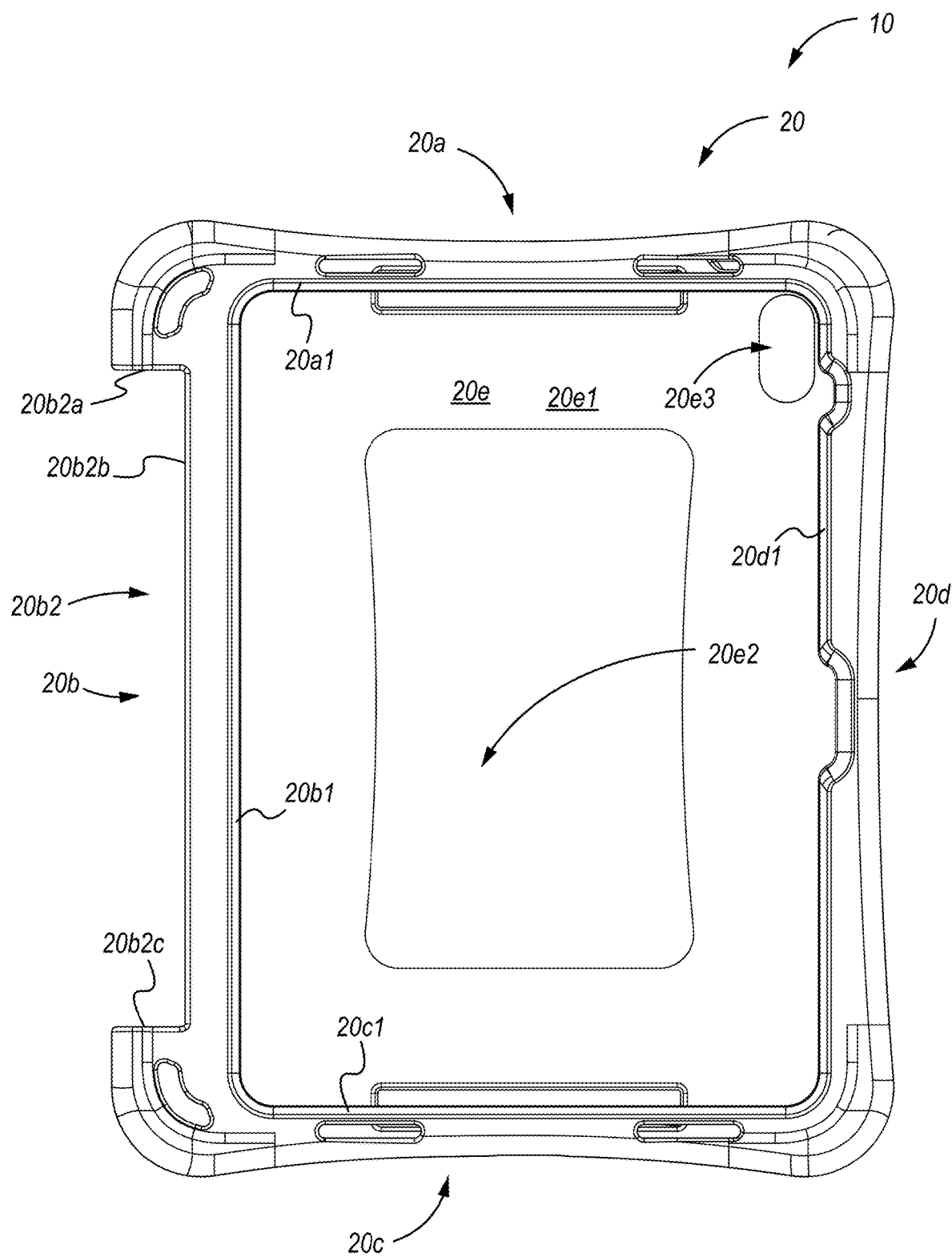
FIG. 3 a top plan view of a case assembly of the portable electronic computing device case system of FIG. 1.

Turning to FIG. 3, depicted therein a top plan view of case assembly 20 of portable electronic computing device case system 10. In implementations case assembly 20 includes side 20a, side 20b, side 20c, side 20d, and base 20e. In implementations side 20a includes interior 20a1. In implementations side 20b includes interior 20b1, elongated recess 20b2 with side 20b2a, side 20b2b, and side 20b2c. In implementations side 20c includes interior 20c1. In implementations side 20d includes interior 20d1. In implementations base 20e includes interior 20e1, aperture 20e2, and aperture 20e3.

Figure 4:
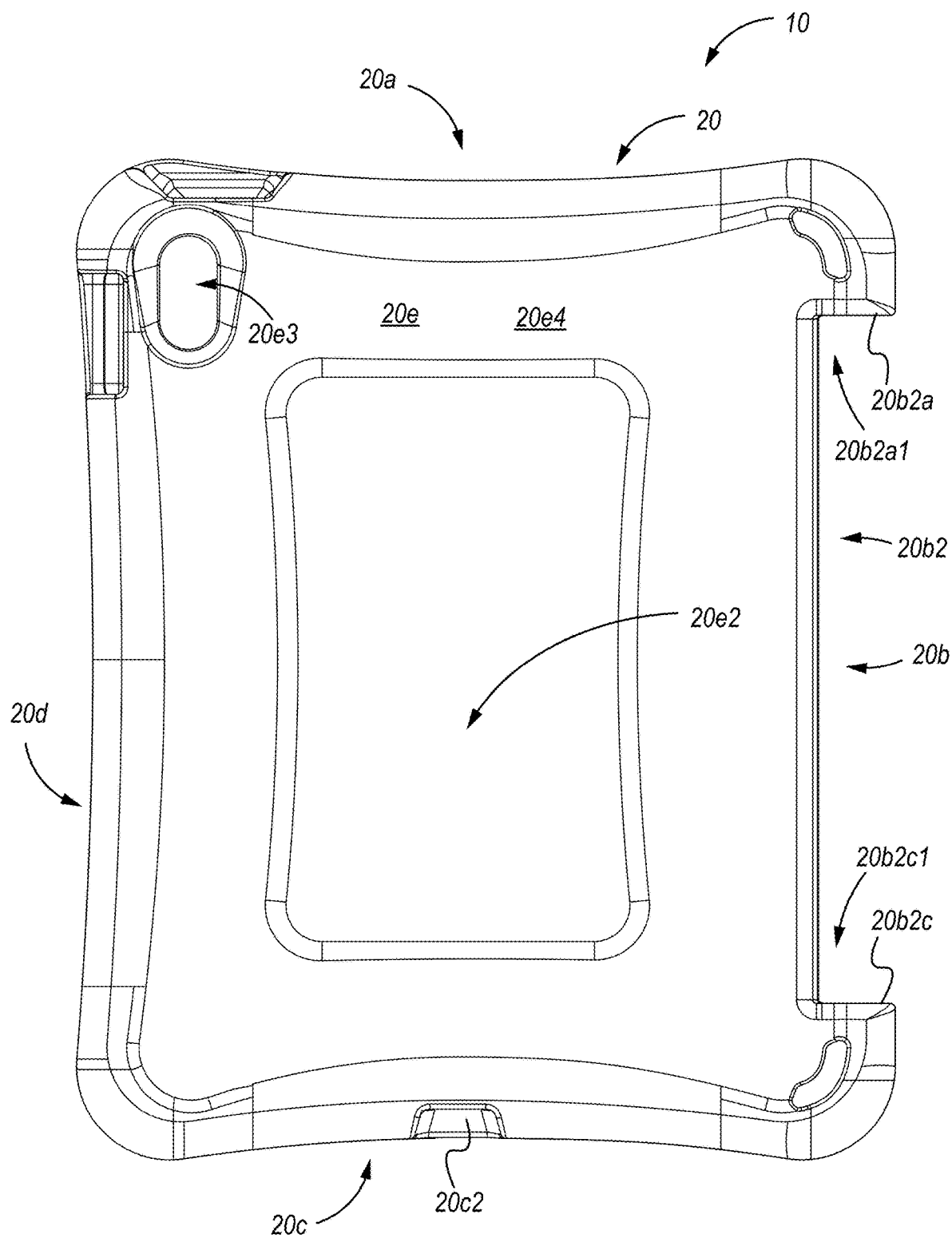
FIG. 4 a bottom plan view of the case assembly of FIG. 3.

Turning to FIG. 4, depicted therein a bottom plan view of case assembly 20. In implementations side 20b2a includes aperture 20b2a1. In implementations side 20b2c includes aperture 20b2c1. In implementations side 20c includes aperture 20c2. In implementations base 20e includes exterior 20e4.

Figure 5:
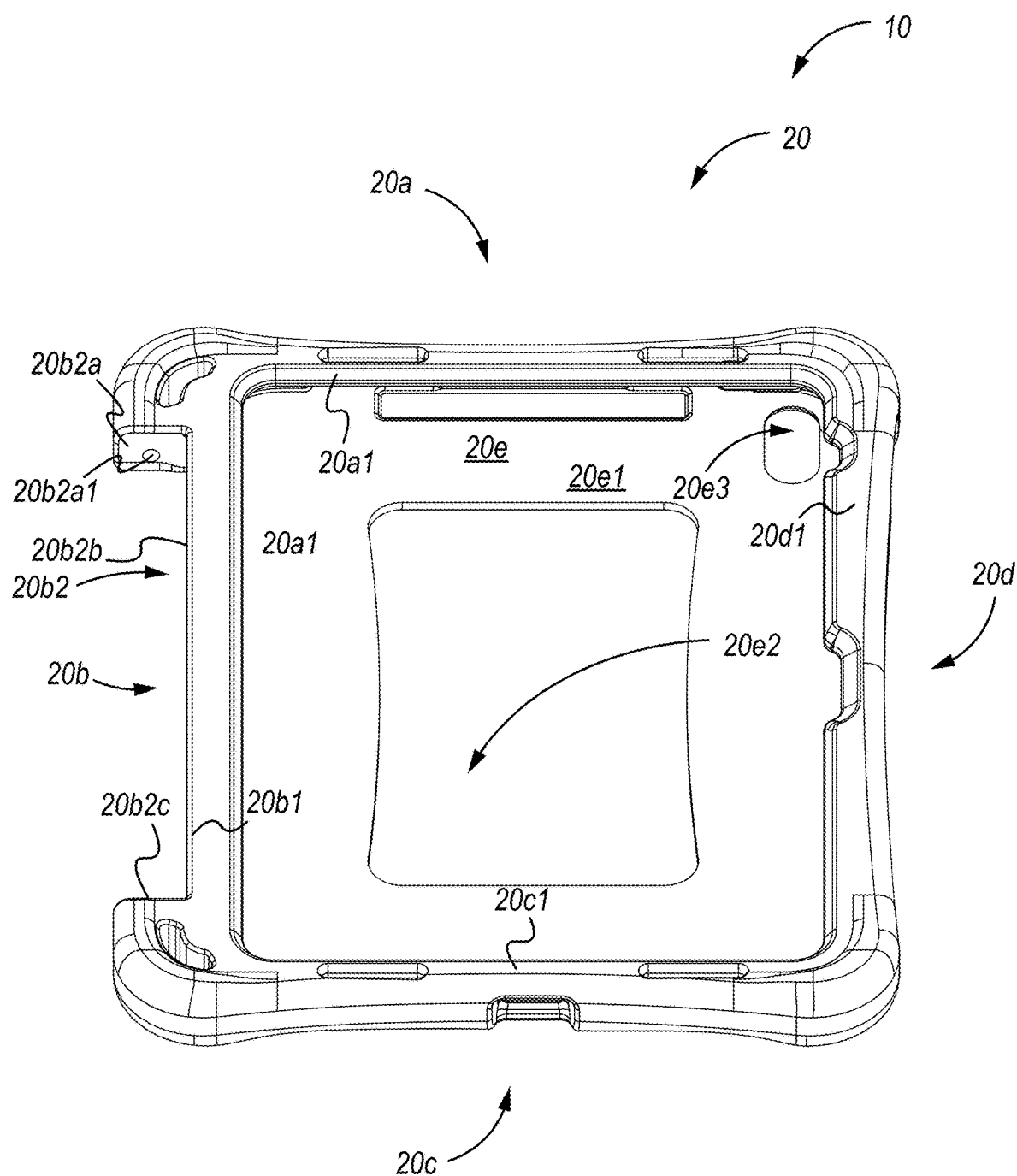
FIG. 5 a top perspective view of the case assembly of FIG. 3.

Turning to FIG. 5, depicted therein a top perspective view of case assembly 20.

Figure 6:
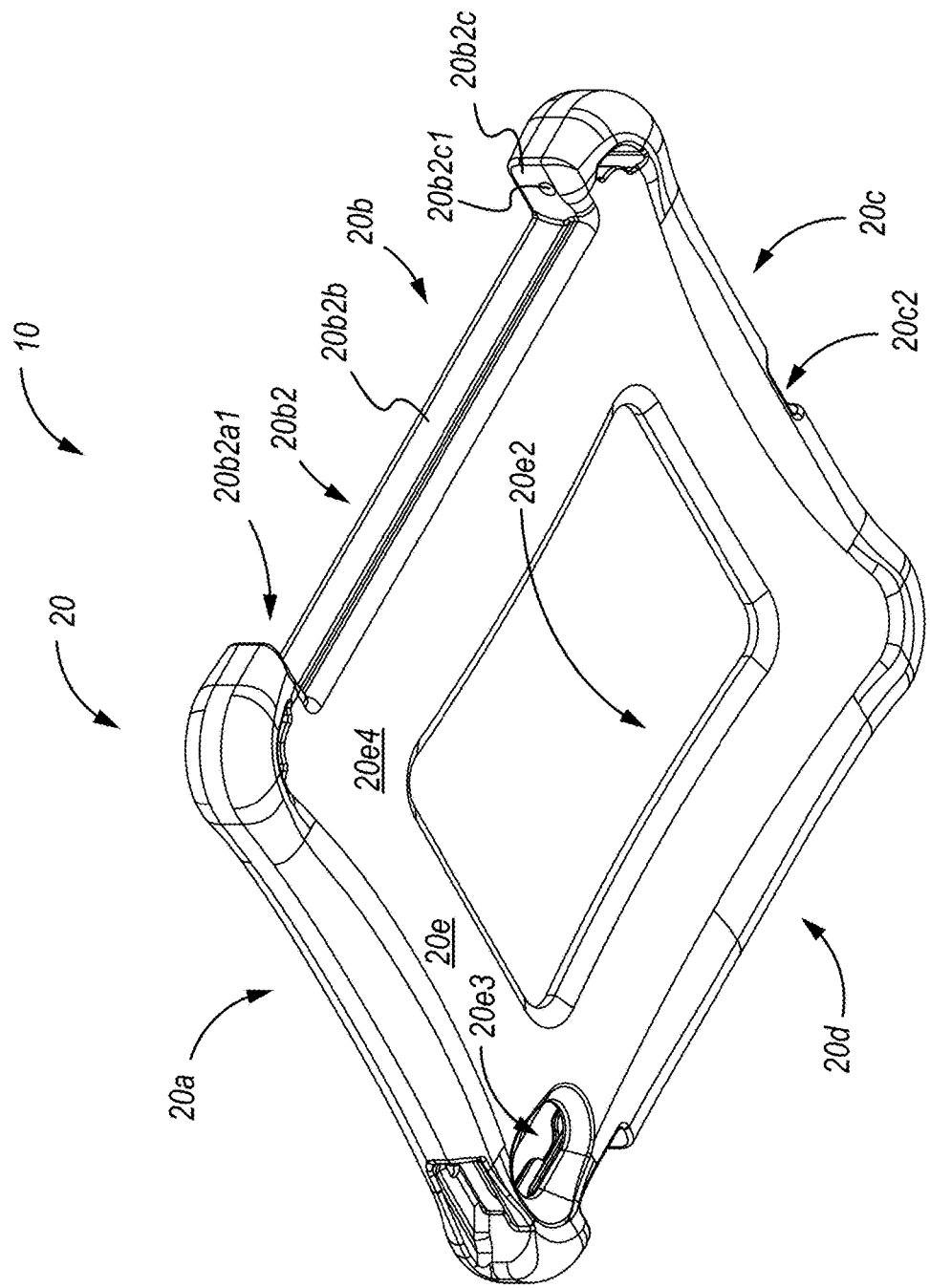
FIG. 6 a bottom perspective view of the case assembly of FIG. 3.

Turning to FIG. 6, depicted therein a bottom perspective view of case assembly 20.

Figure 7:
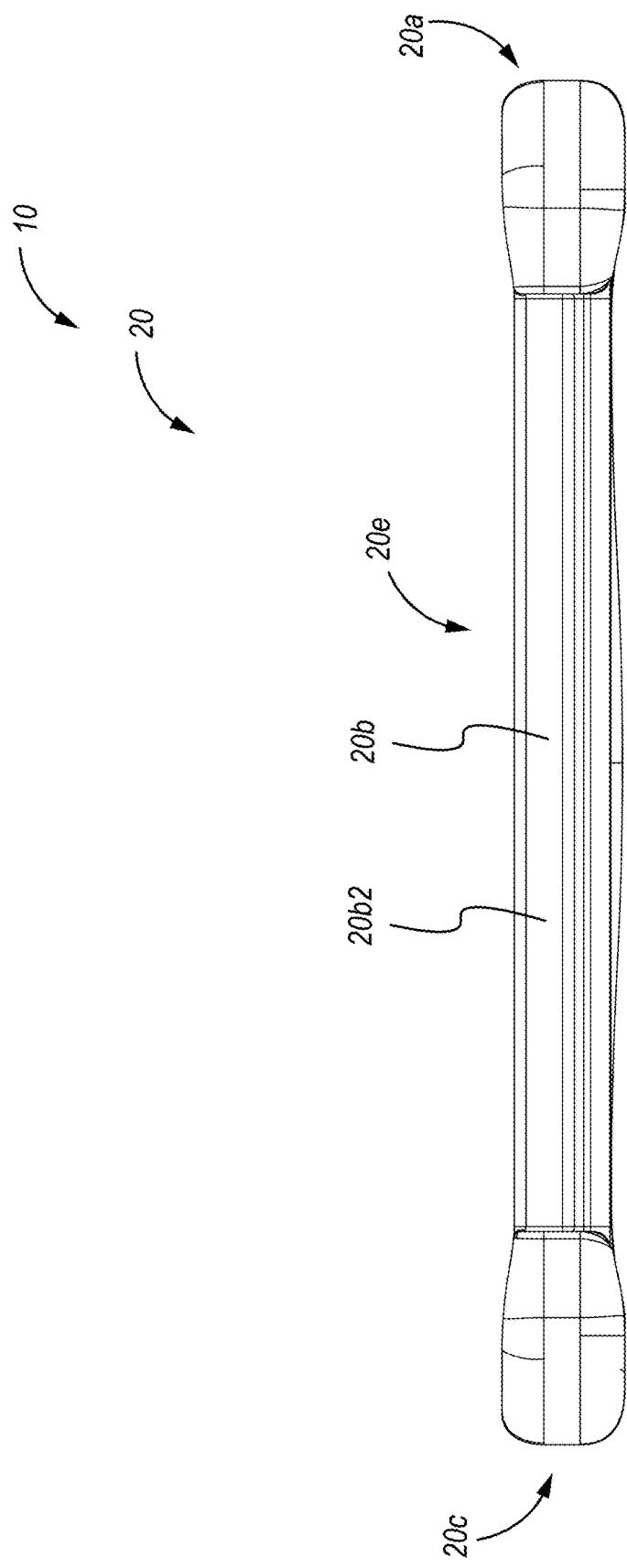
FIG. 7 a left side elevational view of the case assembly of FIG. 3.

Turning to FIG. 7, depicted therein a left side elevational view of case assembly 20.

Figure 8:
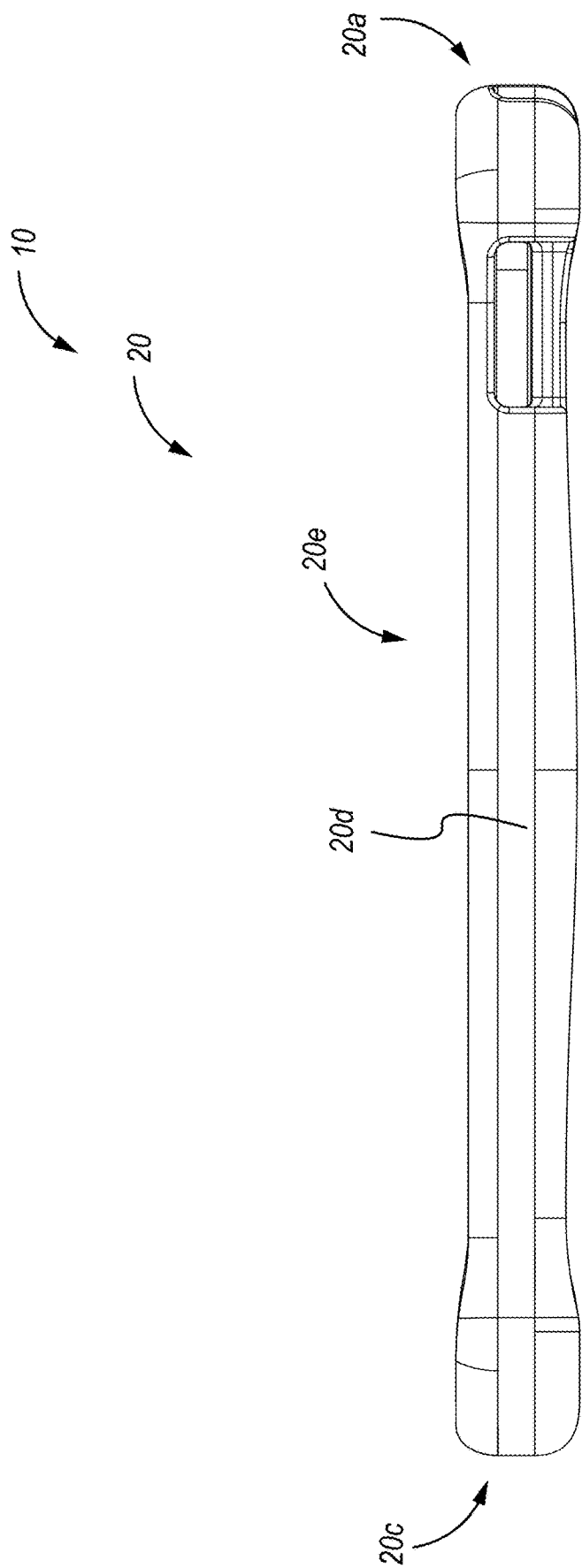
FIG. 8 a right side elevational view of the case assembly of FIG. 3.

Turning to FIG. 8, depicted therein a right side elevational view of case assembly 20.

Figure 9:
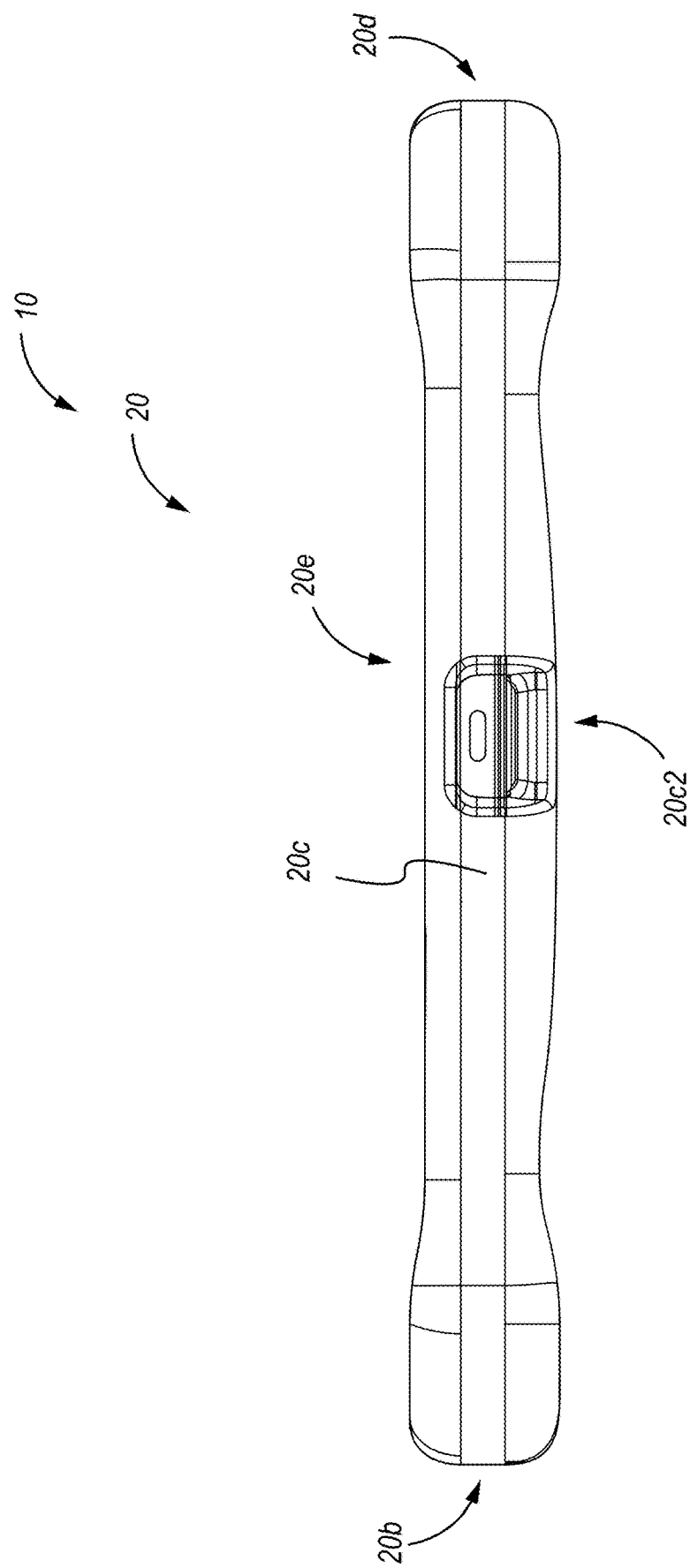
FIG. 9 a front side elevational view of the case assembly of FIG. 3.

Turning to FIG. 9, depicted therein a front side elevational view of case assembly 20.

Figure 10:
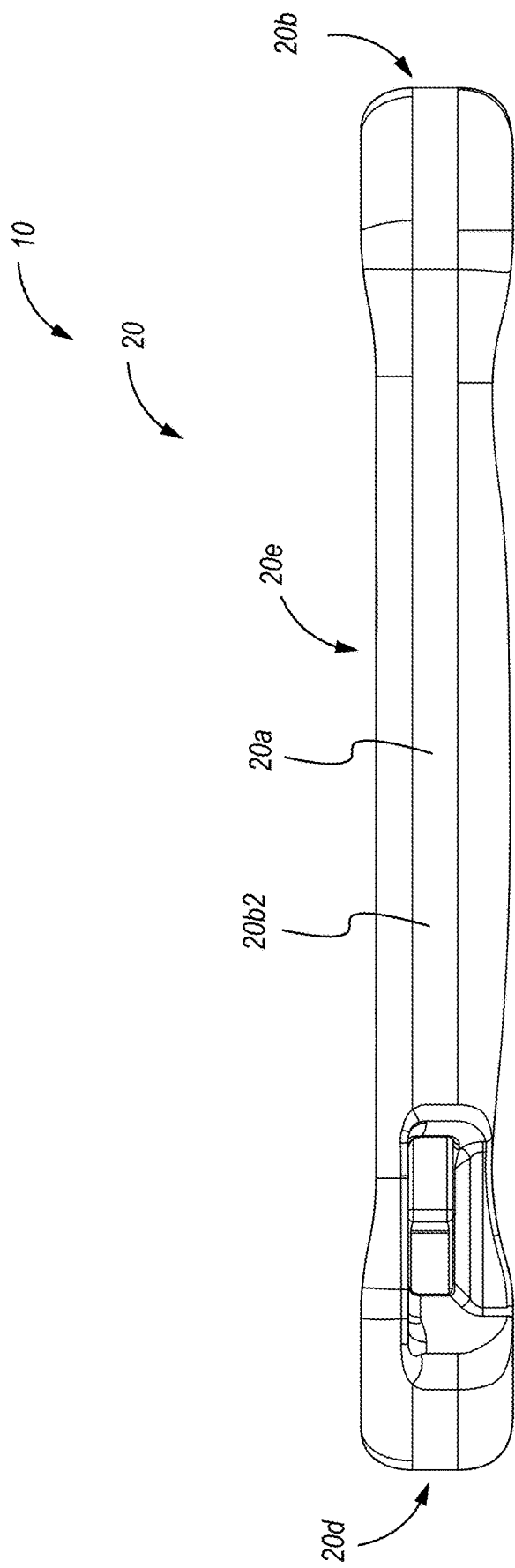
FIG. 10 a rear side elevational view of the case assembly of FIG. 3.

Turning to FIG. 10, depicted therein a rear side elevational view of case assembly 20.

Figure 11:
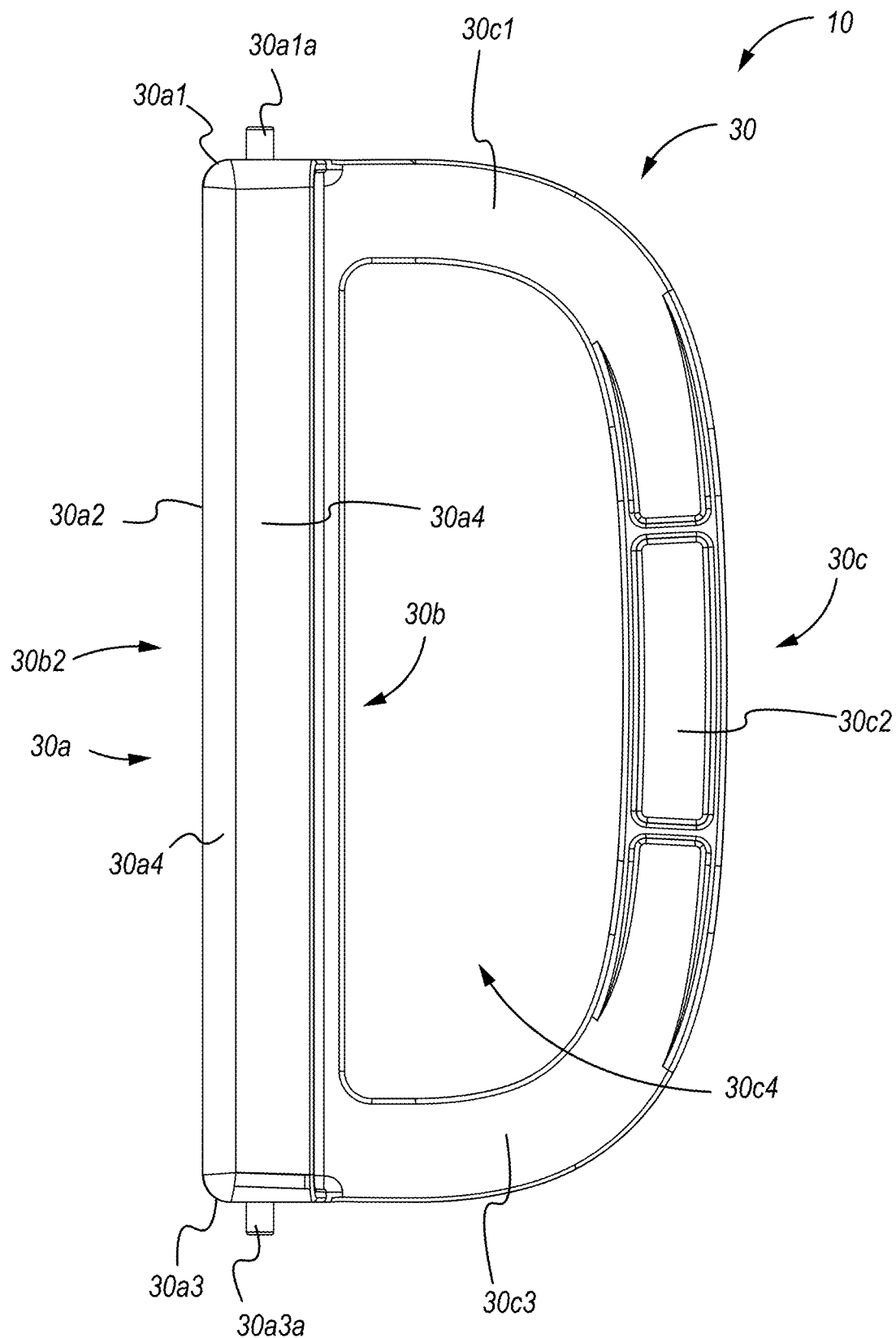
FIG. 11 a top plan view of a handle assembly of the portable electronic computing device case system of FIG. 1.

Turning to FIG. 11, depicted therein a top plan view of stand assembly 30 of portable electronic computing device case system 10. In implementations stand assembly 30 includes elongated member 30a, elongated cavity 30b, and base member 30c. In implementations elongated member 30a includes end portion 30a1 with peg portion 30a1a, mid portion 30a2, end portion 30a3 with peg portion 30a3a, and side 30a4. In implementations base member 30c includes end portion 30c1, mid portion 30c2, end portion 30c3, and aperture 30c4.

Figure 12:
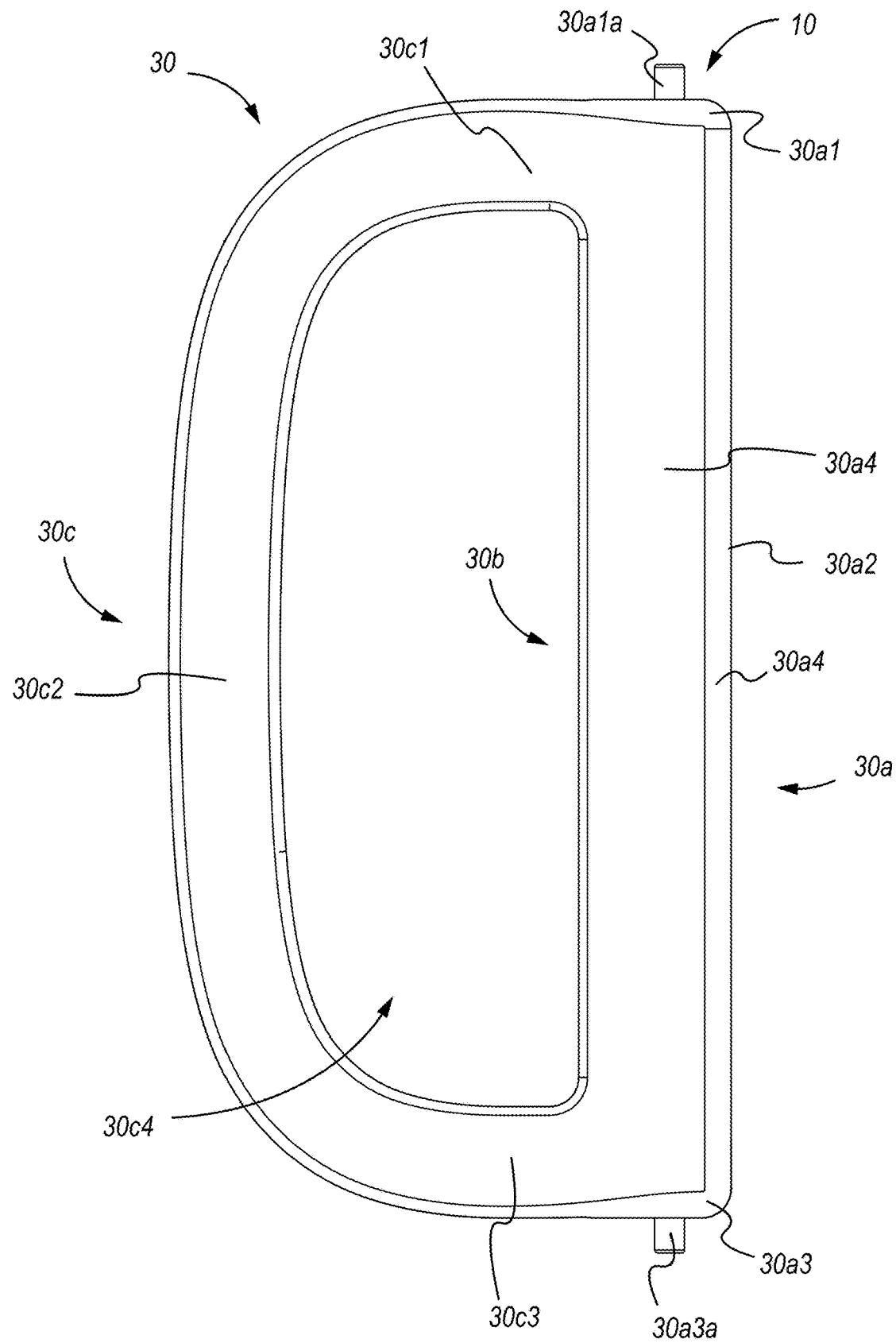
FIG. 12 a bottom plan view of the handle assembly of FIG. 11.

Turning to FIG. 12, depicted therein a bottom plan view of stand assembly 30.

Figure 13:
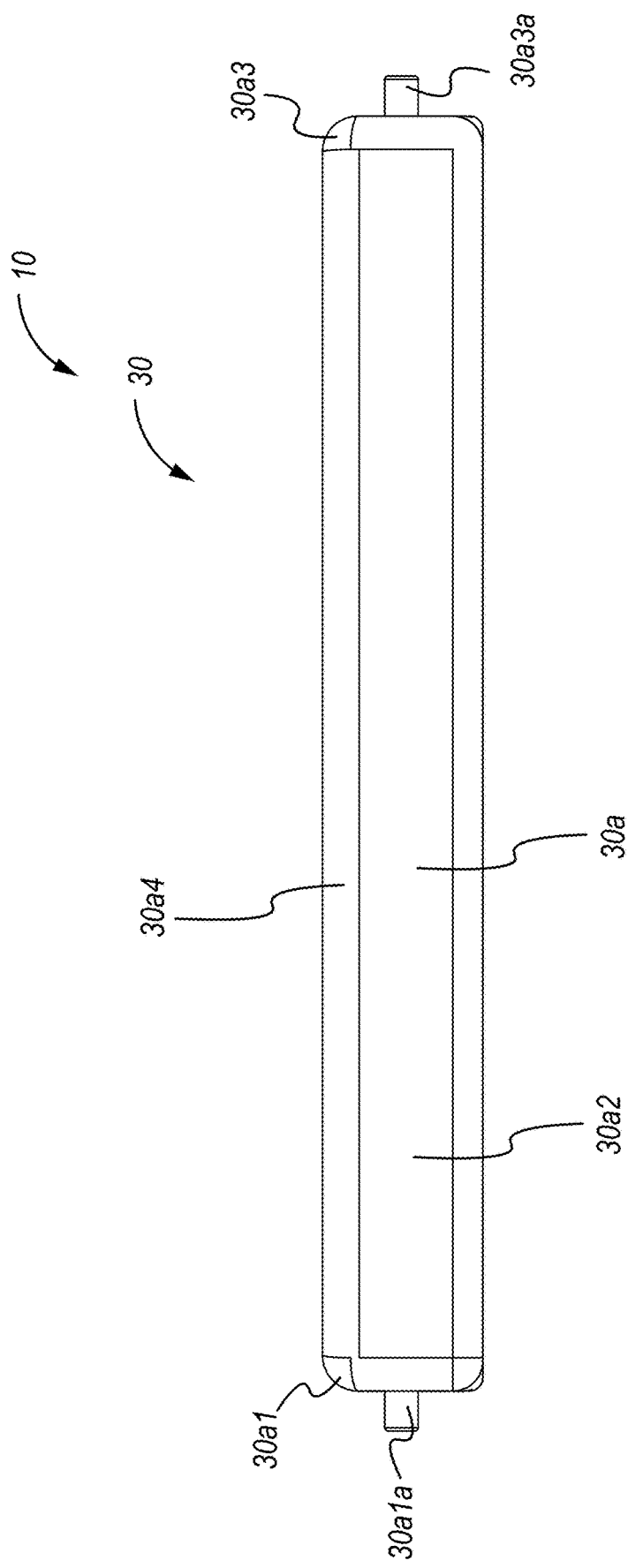
FIG. 13 a left side elevational view of the handle assembly of FIG. 11.

Turning to FIG. 13, depicted therein a left side elevational view of stand assembly 30.

Figure 14:
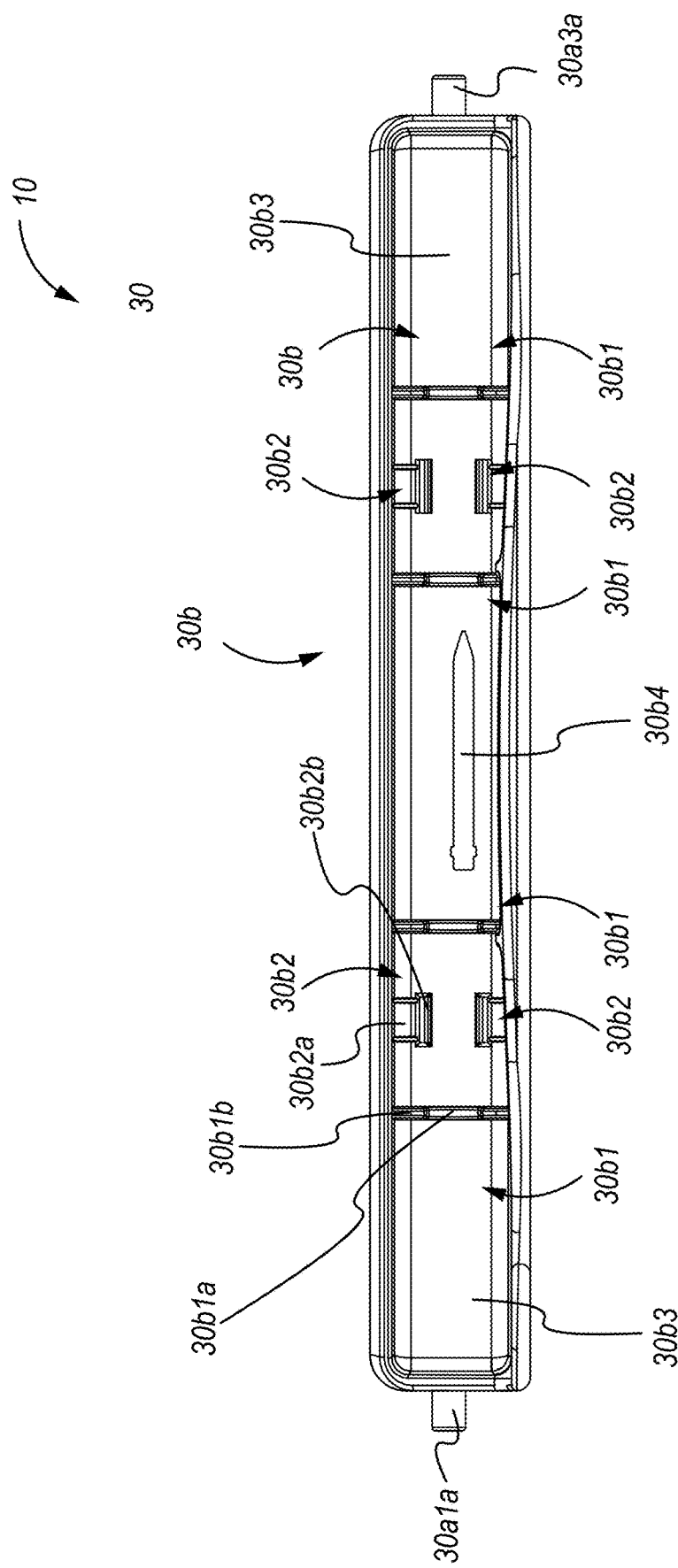
FIG. 14 a right side elevational view of the handle assembly of FIG. 11.

Turning to FIG. 14, depicted therein a right side elevational view of stand assembly 30. In implementations elongated cavity 30b includes support 30b1 with groove 30b1a, stay 30b1b, support 30b2 with base 30b2a and pad 30b2b, floor 30b3 and indicia 30b4.

Figure 15:
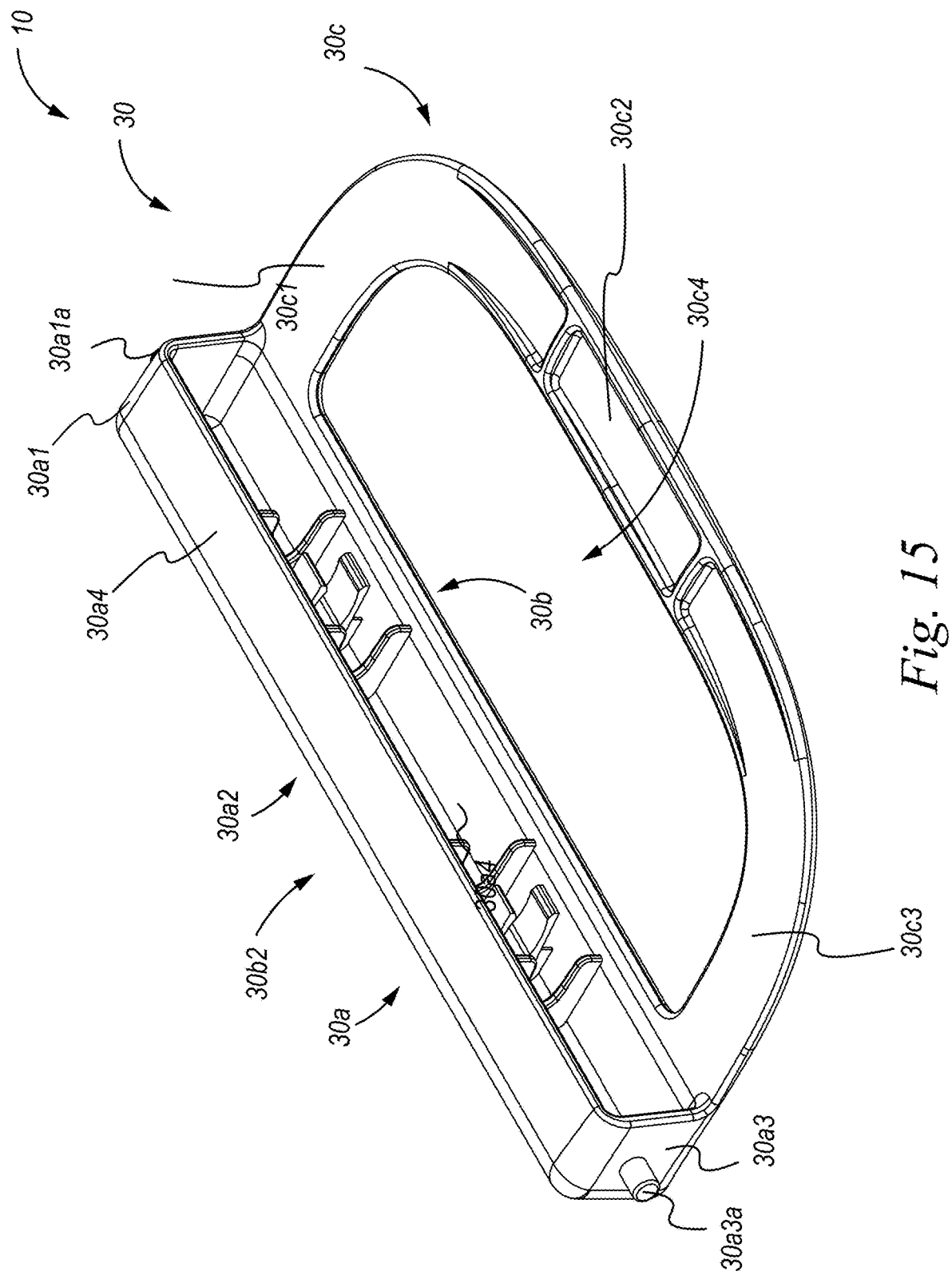
FIG. 15 a top perspective view of the handle assembly of FIG. 11.

Turning to FIG. 15, depicted therein a top perspective view of stand assembly 30.

Figure 16:
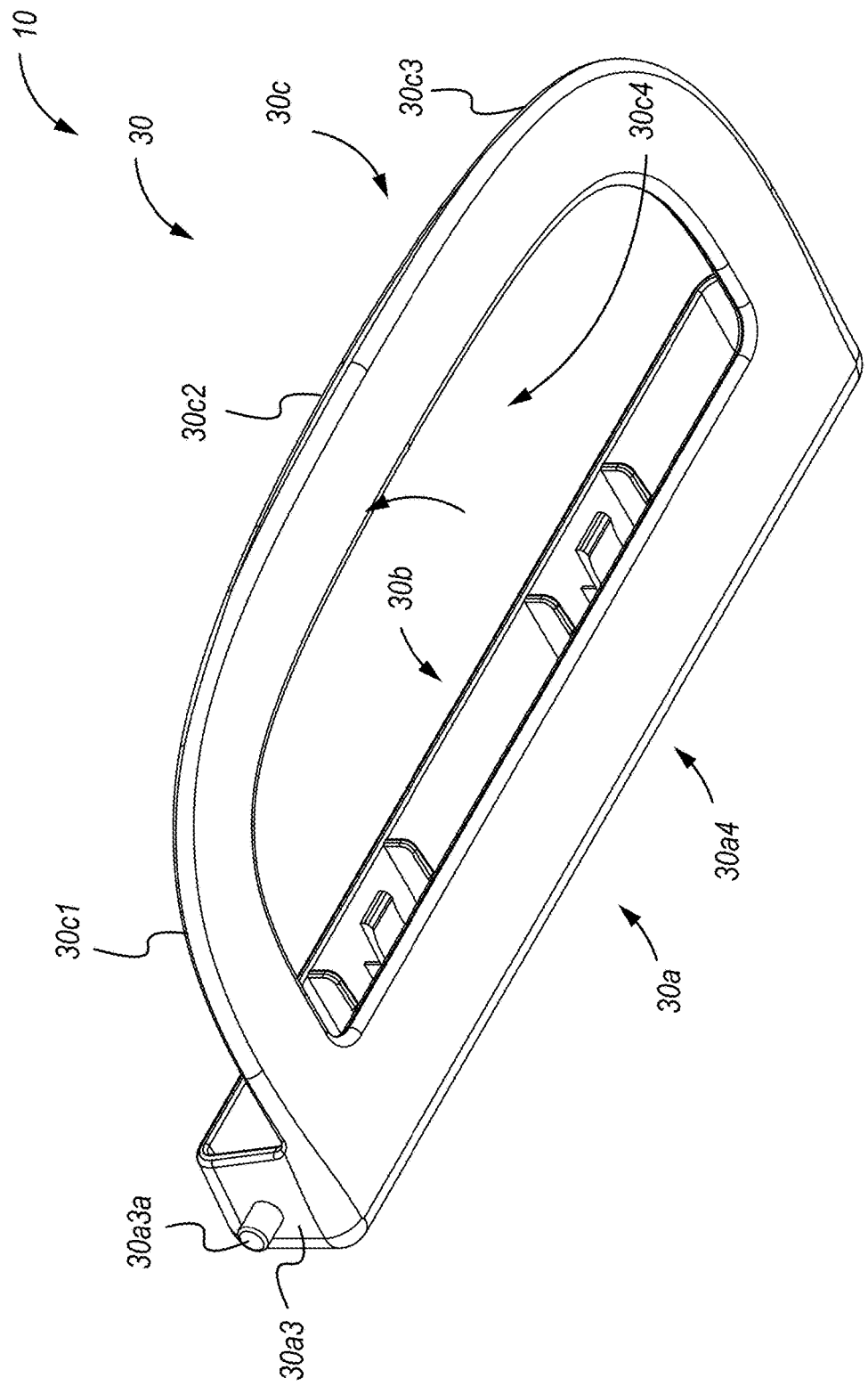
FIG. 16 a bottom perspective view of the handle assembly of FIG. 11.

Turning to FIG. 16, depicted therein a bottom perspective view of stand assembly 30.

Figure 17:
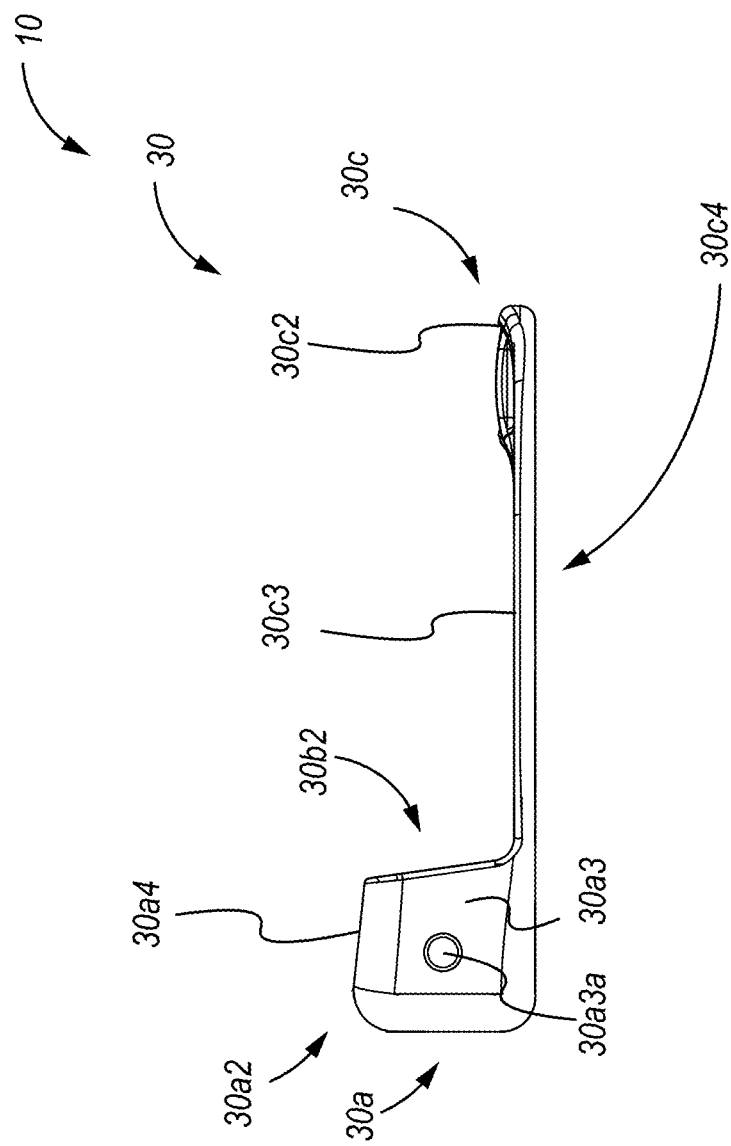
FIG. 17 a front side elevational view of the handle assembly of FIG. 11.

Turning to FIG. 17, depicted therein a front side elevational view of stand assembly 30.

Figure 18:
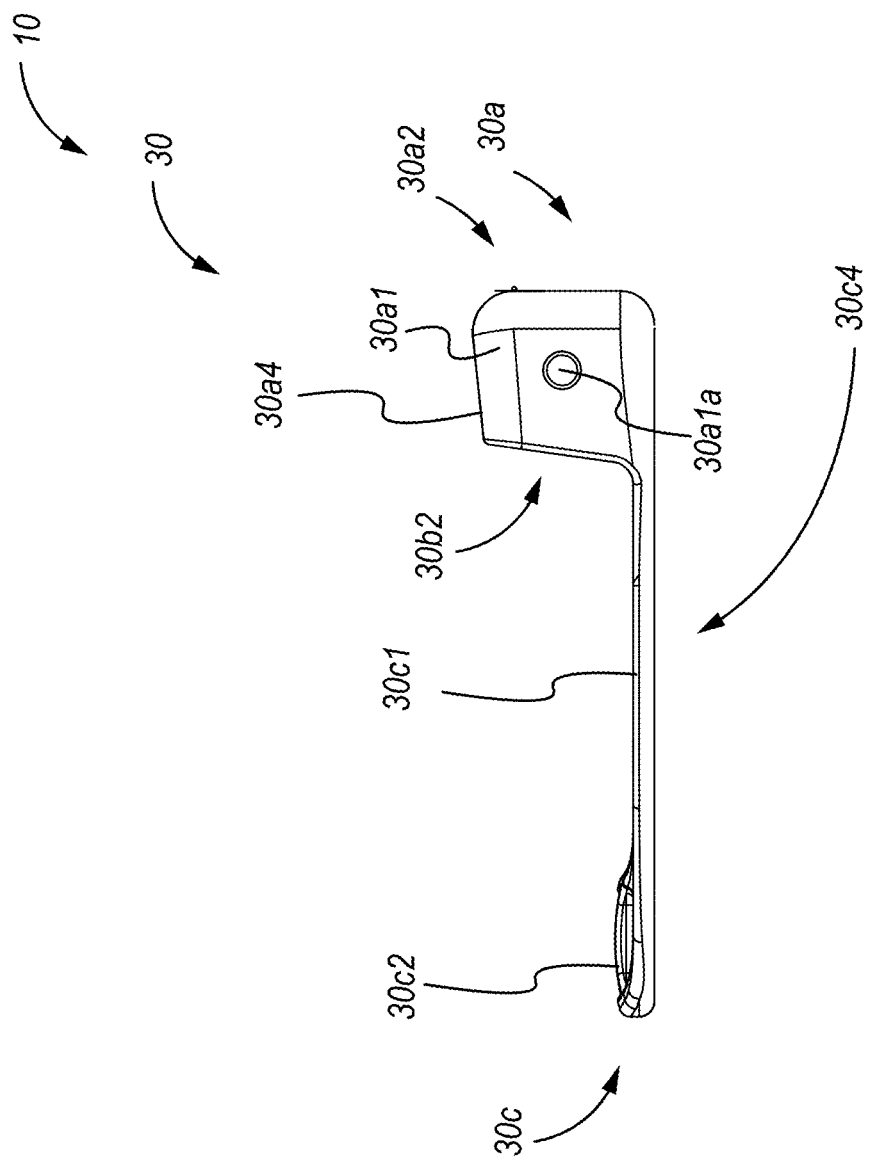
FIG. 18 a rear side elevational view of the handle assembly of FIG. 11.

Turning to FIG. 18, depicted therein a rear side elevational view of stand assembly 30.

Figure 19:
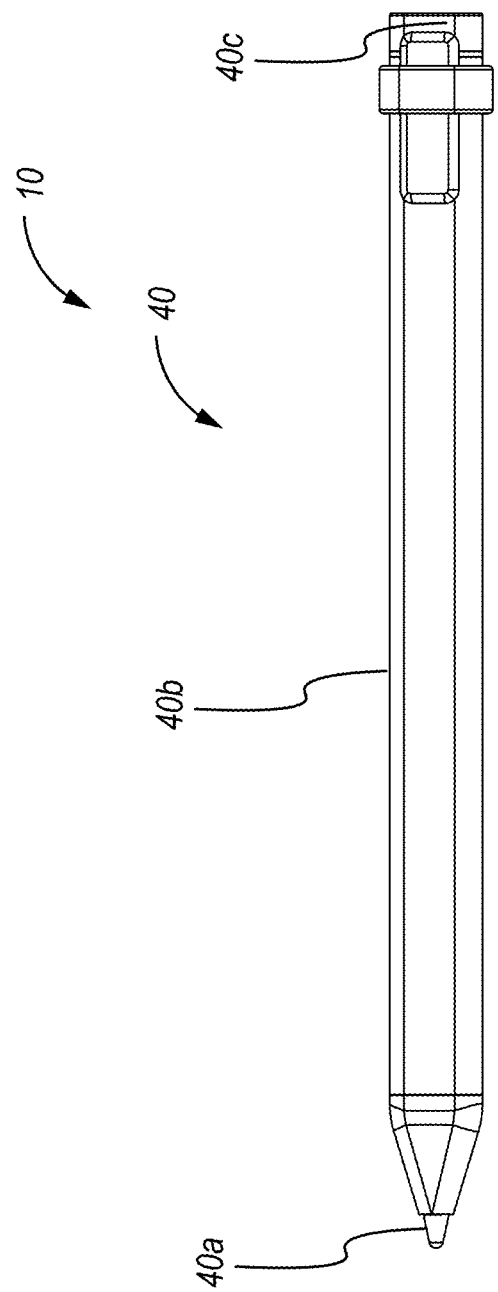
FIG. 19 a side elevational view of a writing utensil of the portable electronic computing device case system of FIG. 1.

Turning to FIG. 19, depicted therein a side elevational view of stylus 40 of portable electronic computing device case system 10. In implementations stylus 40 includes tapered end 40a, mid portion 40b, and end 40c.

Figure 20:
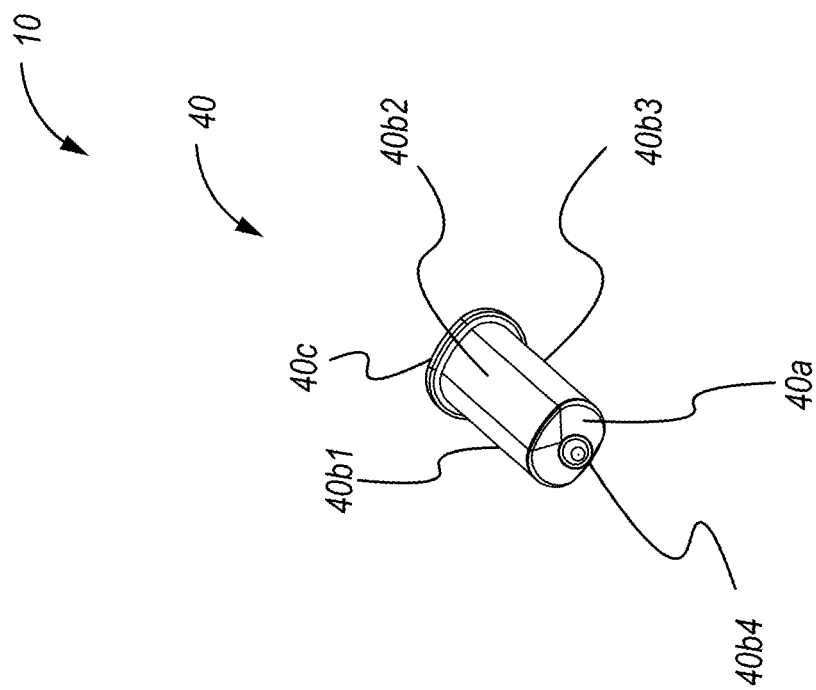
FIG. 20 a perspective view of the writing utensil of FIG. 19.

Turning to FIG. 20, depicted therein a perspective view of stylus 40. In implementations mid portion 40b includes side 40b1, side 40b2, side 40b3, and side 40b4.

Figure 21:
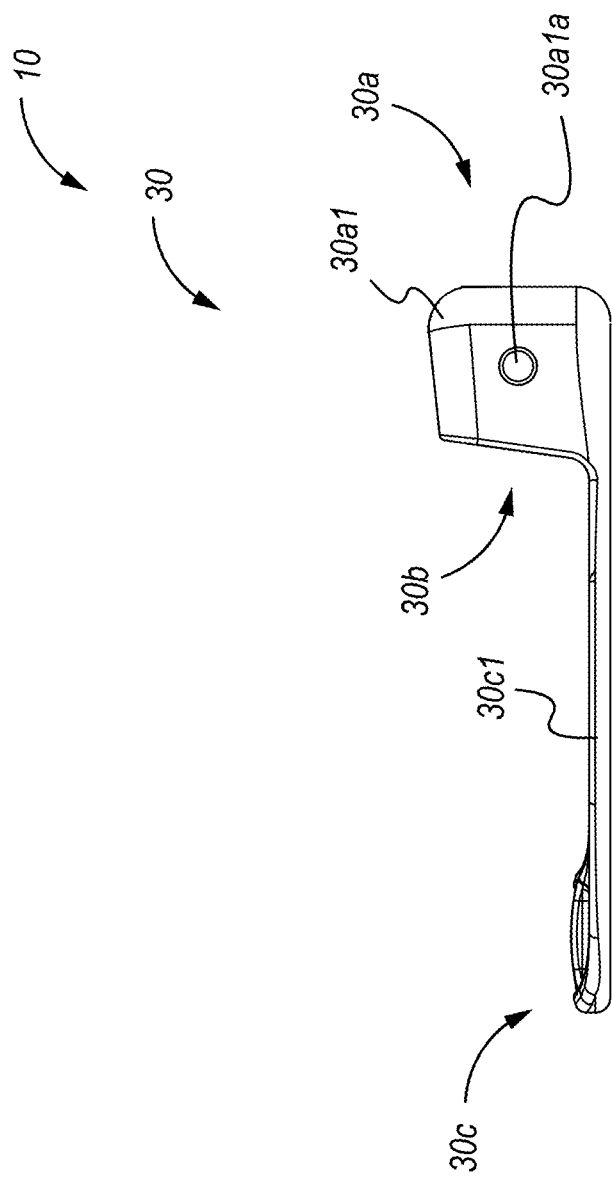
FIG. 21 is a right elevational view of the handle assembly of FIG. 11 containing the writing utensil of FIG. 19.

Turning to FIG. 21, depicted therein is a right elevational view of stand assembly 30 containing stylus 40.

Figure 22:
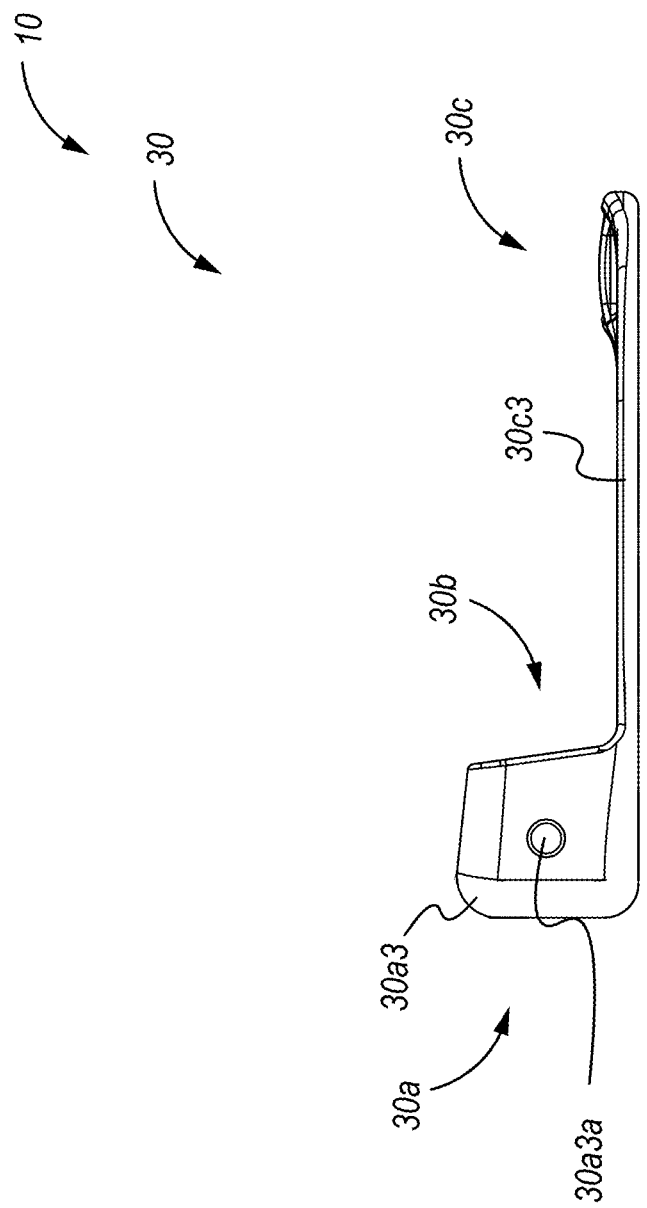
FIG. 22 is a top perspective view of the handle assembly of FIG. 11 containing the writing utensil of FIG. 19.

Turning to FIG. 22, depicted therein is a top perspective view of stand assembly 30 containing stylus 40.

Figure 23:
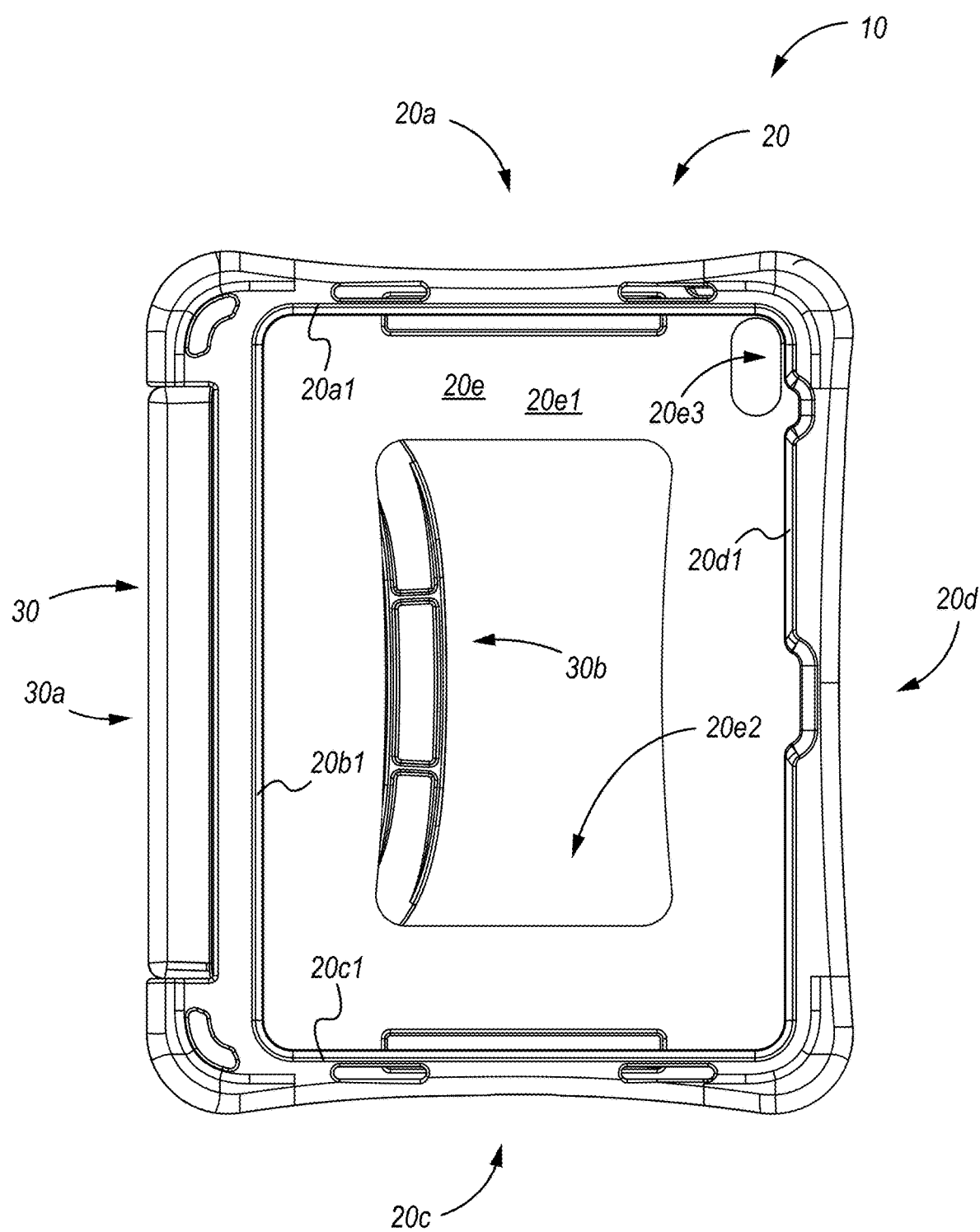
FIG. 23 a top plan view of the portable electronic computing device case system of FIG. 1 in closed configuration.

Turning to FIG. 23, depicted therein a top plan view of portable electronic computing device case system 10 in closed configuration with stand assembly 30 rotatably coupled with case assembly 20 and in a closed rotational position as a first rotational position.

Figure 24:
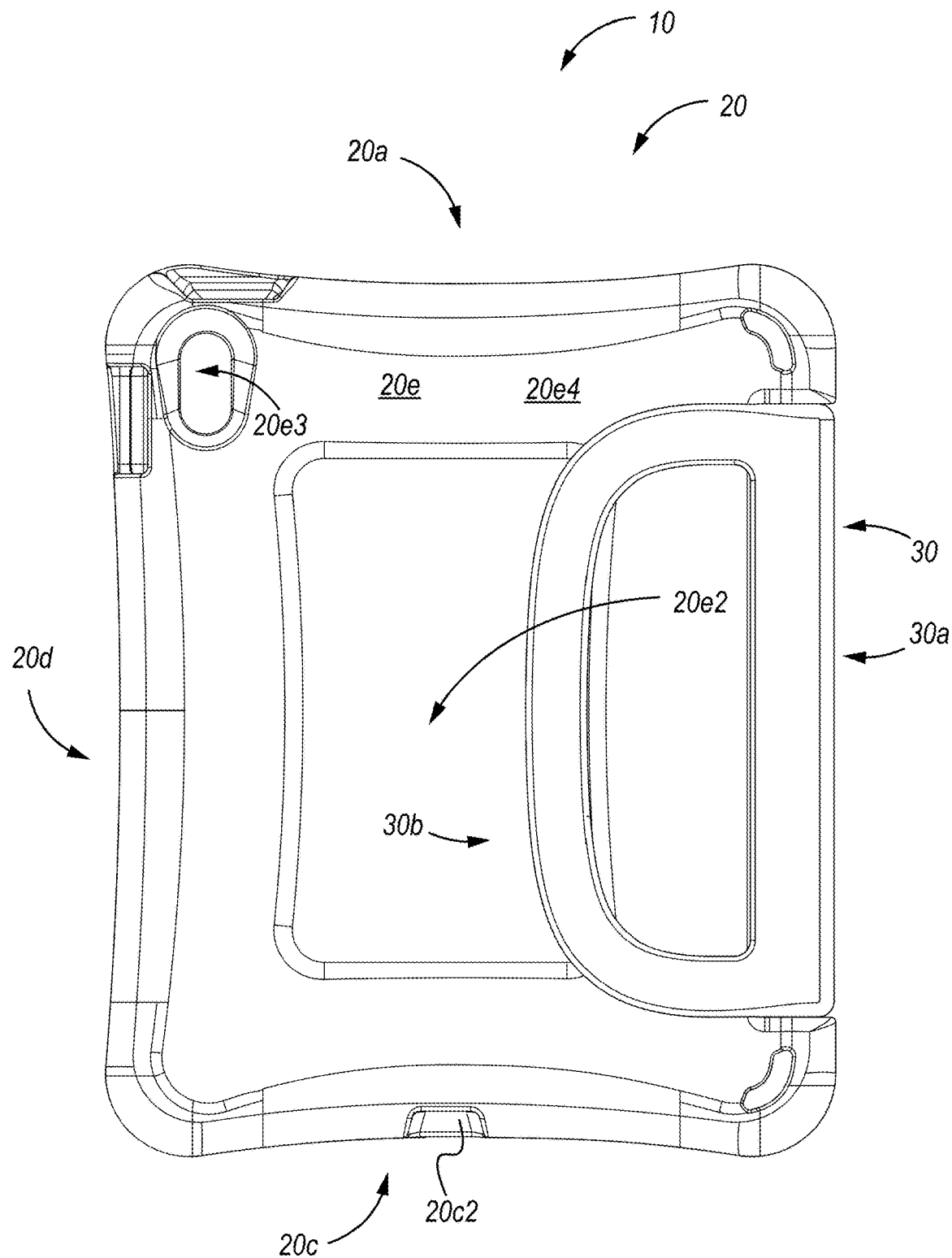
FIG. 24 a bottom plan view of the portable electronic computing device case system of FIG. 1 in closed configuration.

Turning to FIG. 24, depicted therein a bottom plan view of portable electronic computing device case system 10 in closed configuration.

Figure 25:
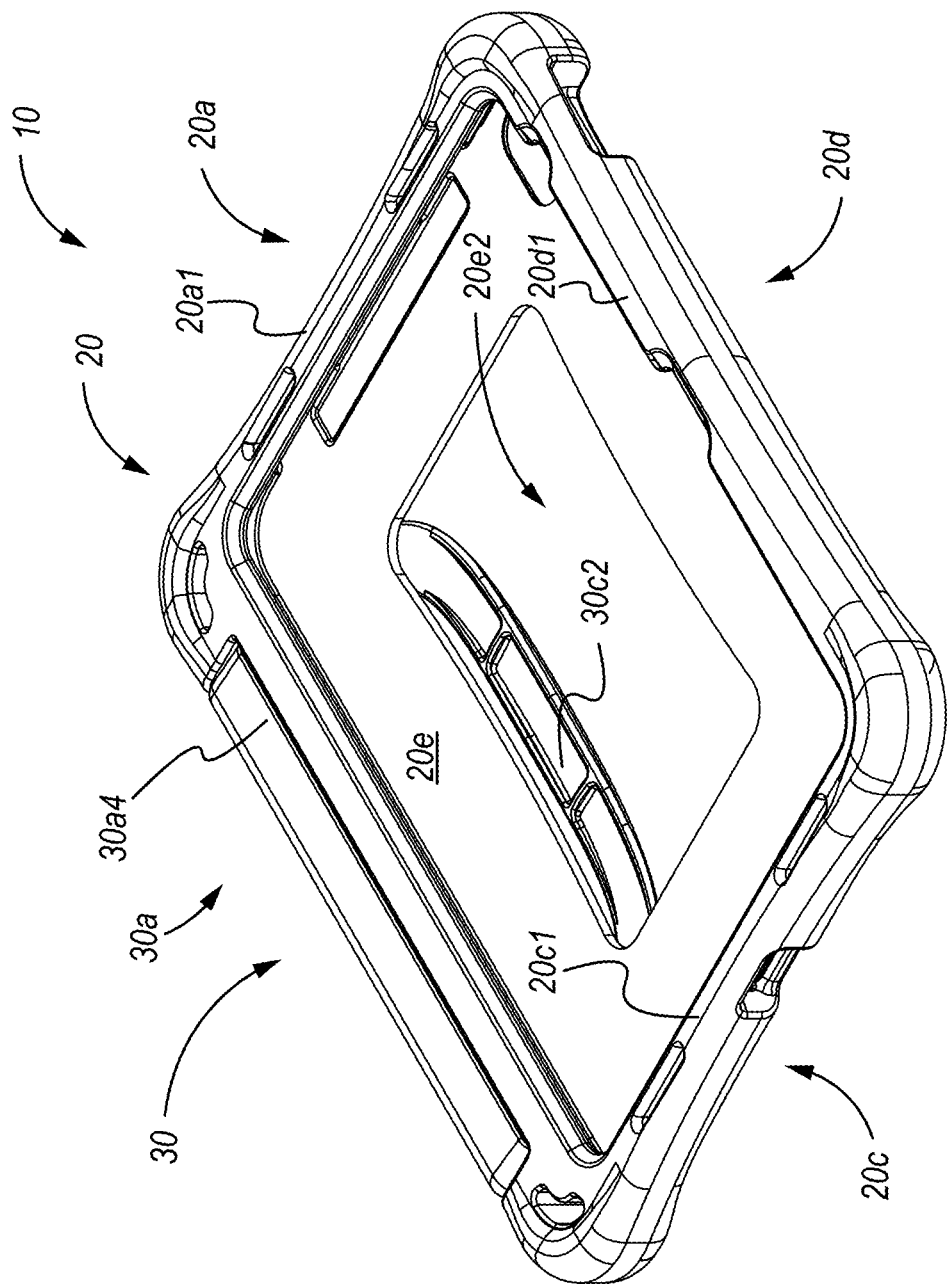
FIG. 25 a top perspective view of the portable electronic computing device case system of FIG. 1 in closed configuration.

Turning to FIG. 25, depicted therein a top perspective view of portable electronic computing device case system 10 in closed configuration.

Figure 26:
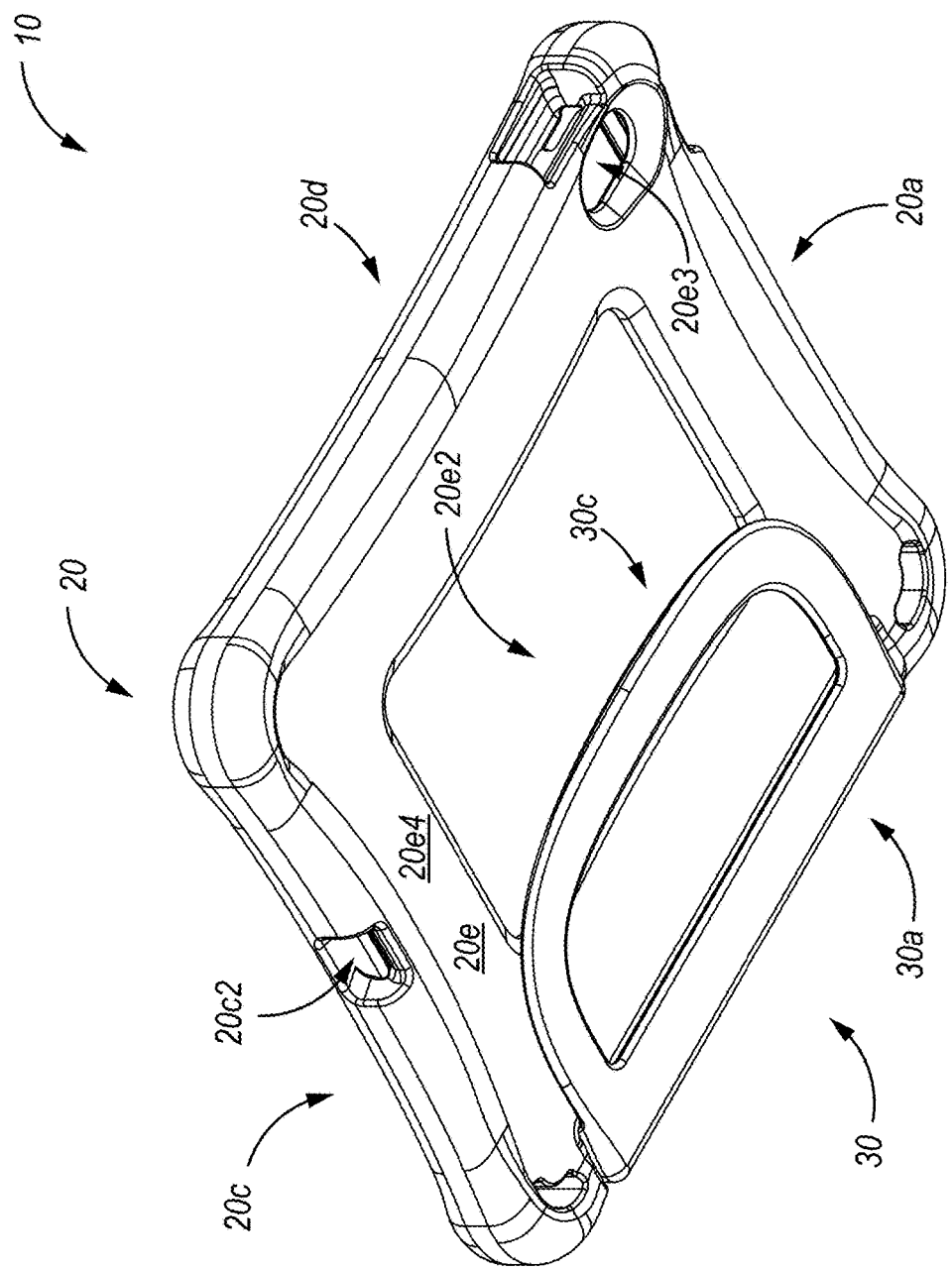
FIG. 26 a bottom perspective view of the portable electronic computing device case system of FIG. 1 in closed configuration.

Turning to FIG. 26, depicted therein a bottom perspective view of portable electronic computing device case system 10 in closed configuration.

Figure 27:
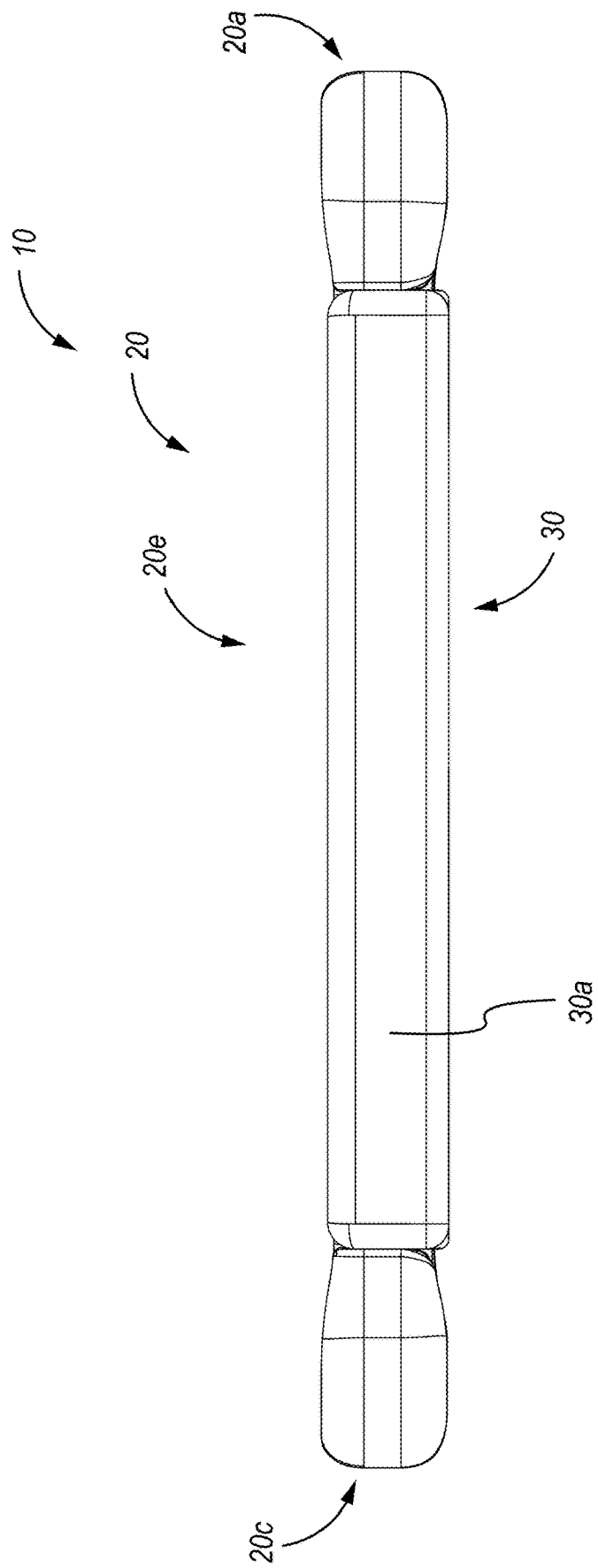
FIG. 27 a left side elevational view of the portable electronic computing device case system of FIG. 1 in closed configuration.

Turning to FIG. 27, depicted therein a left side elevational view of portable electronic computing device case system 10 in closed configuration.

Figure 28:
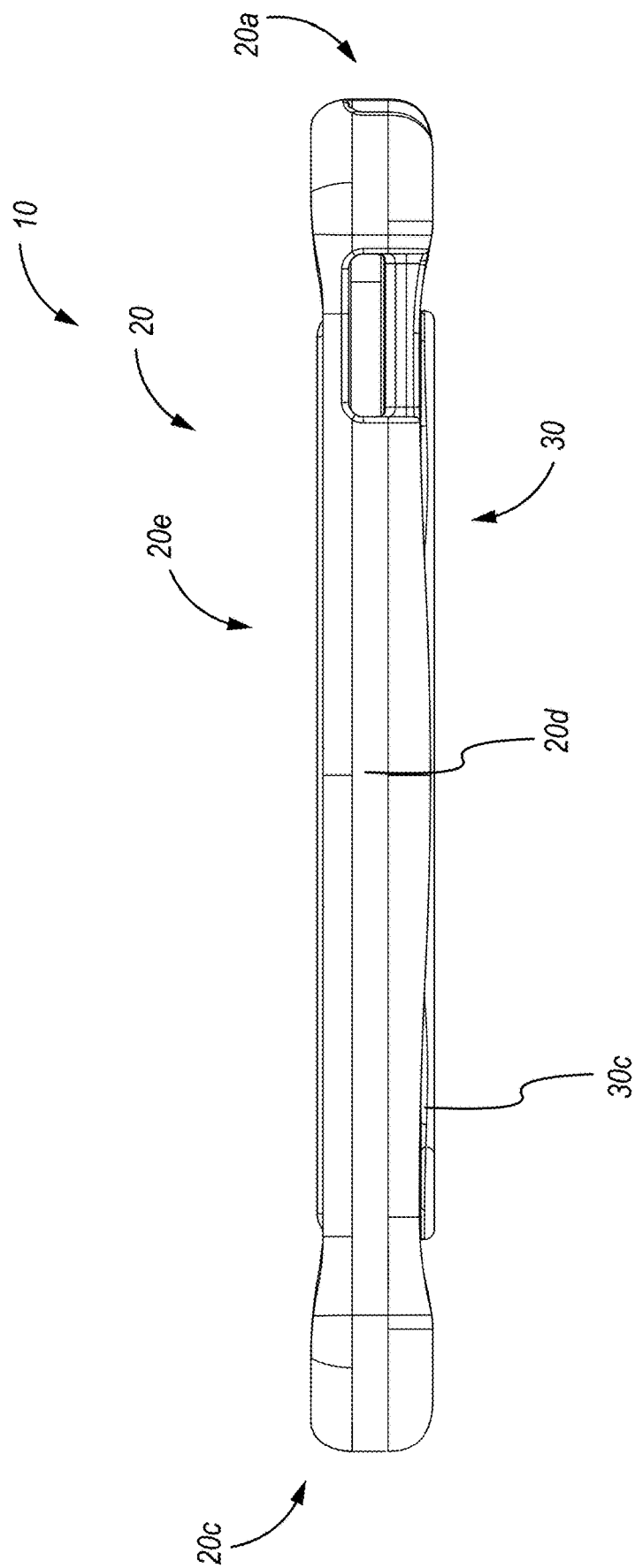
FIG. 28 a right side elevational view of the portable electronic computing device case system of FIG. 1 in closed configuration.

Turning to FIG. 28, depicted therein a right side elevational view of portable electronic computing device case system 10 in closed configuration.

Figure 29:
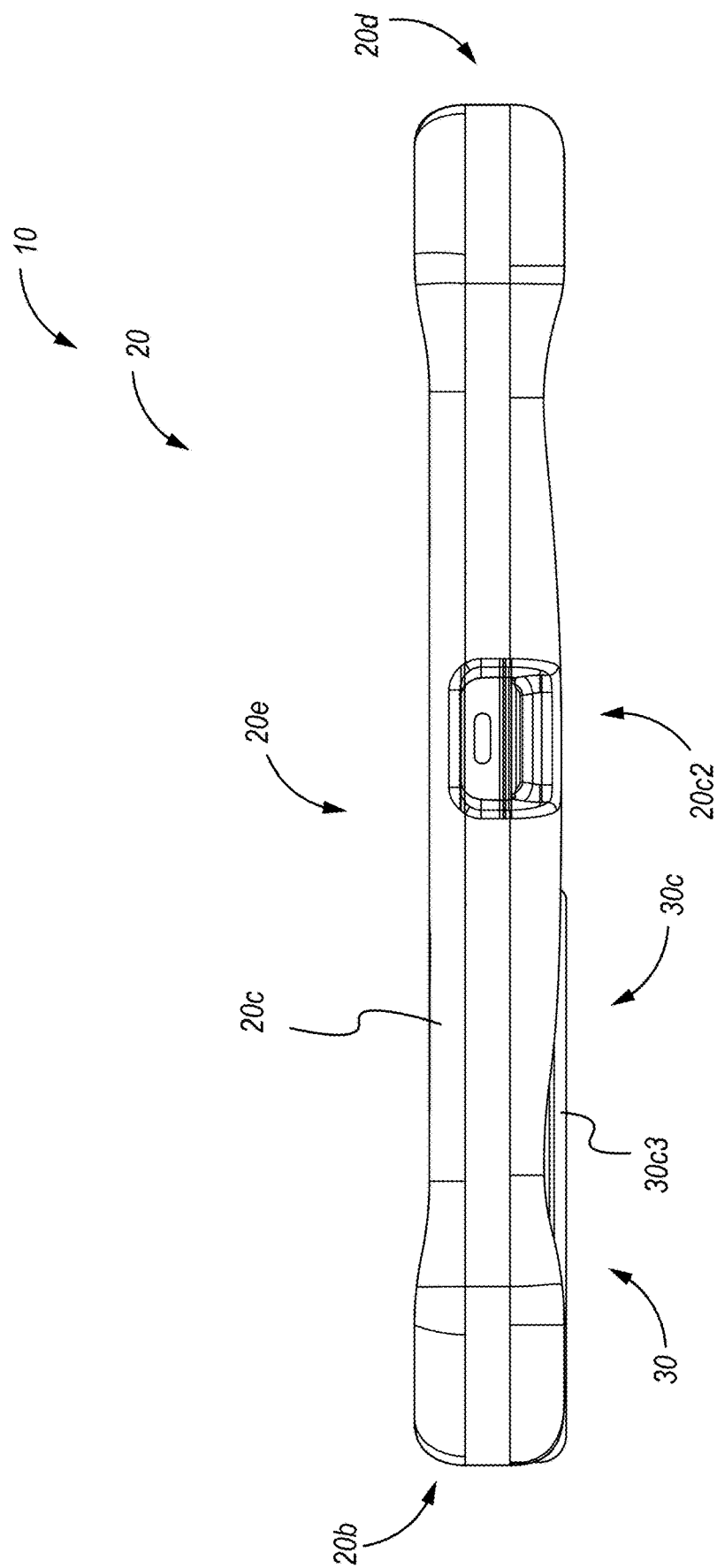
FIG. 29 a front side elevational view of the portable electronic computing device case system of FIG. 1 in closed configuration.

Turning to FIG. 29, depicted therein a front side elevational view of portable electronic computing device case system 10 in closed configuration.

Figure 30:
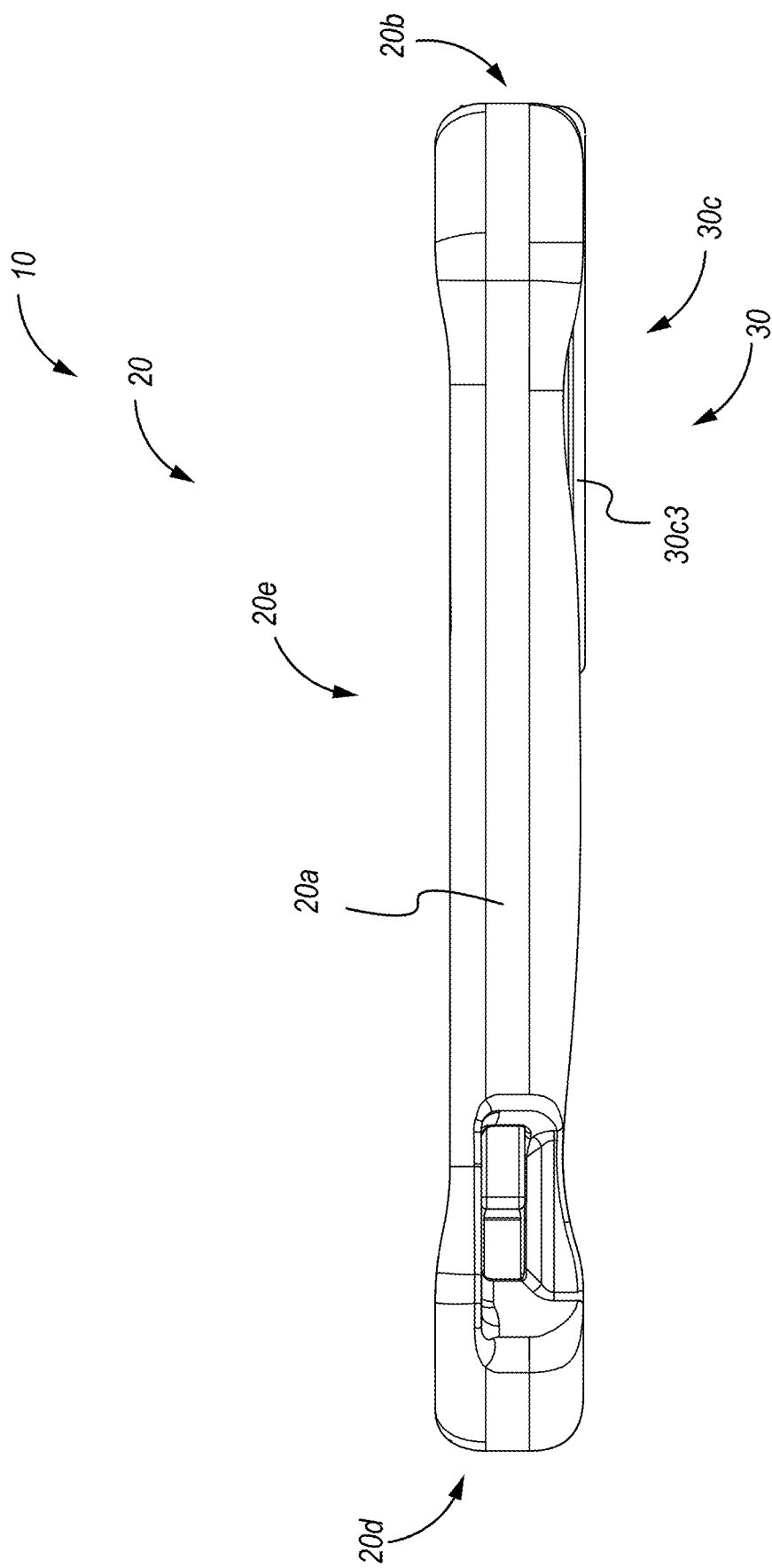
FIG. 30 a rear side elevational view of the portable electronic computing device case system of FIG. 1 in closed configuration.

Turning to FIG. 30, depicted therein a rear side elevational view of portable electronic computing device case system 10 in closed configuration.

Figure 31:
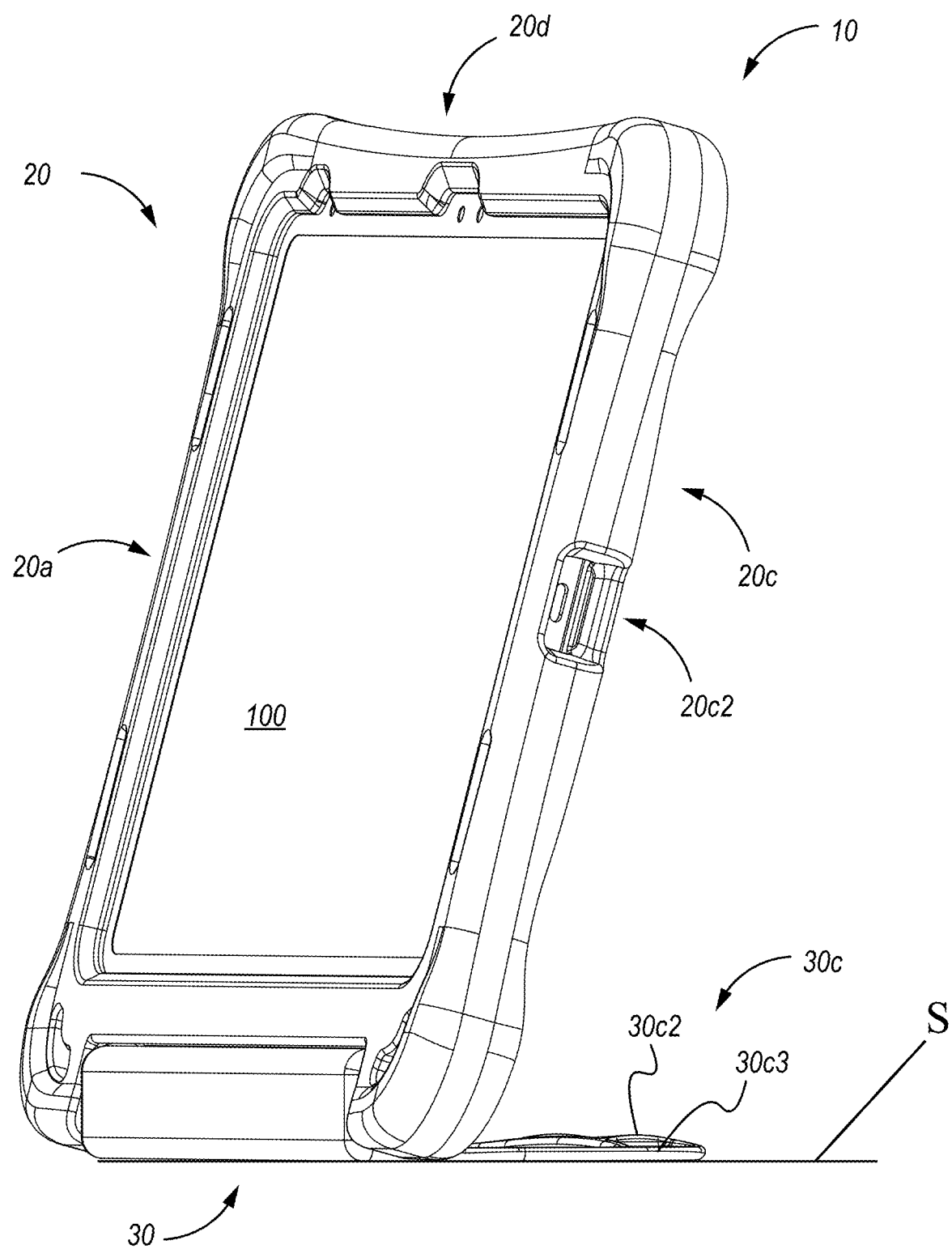
FIG. 31 a side perspective view of the portable electronic computing device case system of FIG. 1 containing the portable electronic computing device of FIG. 1 in open configuration.

Turning to FIG. 31, depicted therein a side perspective view of portable electronic computing device case system 10 containing portable electronic computing device 100 in open configuration with stand assembly 30 rotatably coupled with case assembly 20 and in a open rotational position as a second rotational position and with portions of case assembly 20 and stand assembly 30 contacting horizontal surface S. In implementations frictional resistance exists between stand assembly 30 and case assembly 20 when stand assembly 30 rotatably positioned between the first and second rotational positions which must be overcome to move stand assembly 30 between the two positions to consequently help prevent unintentional movement of stand assembly 30. For instance, in implementations this frictional resistance can occur between elongated member 30a of stand assembly 30 and side 20b2b of case assembly 20.

Figure 32:
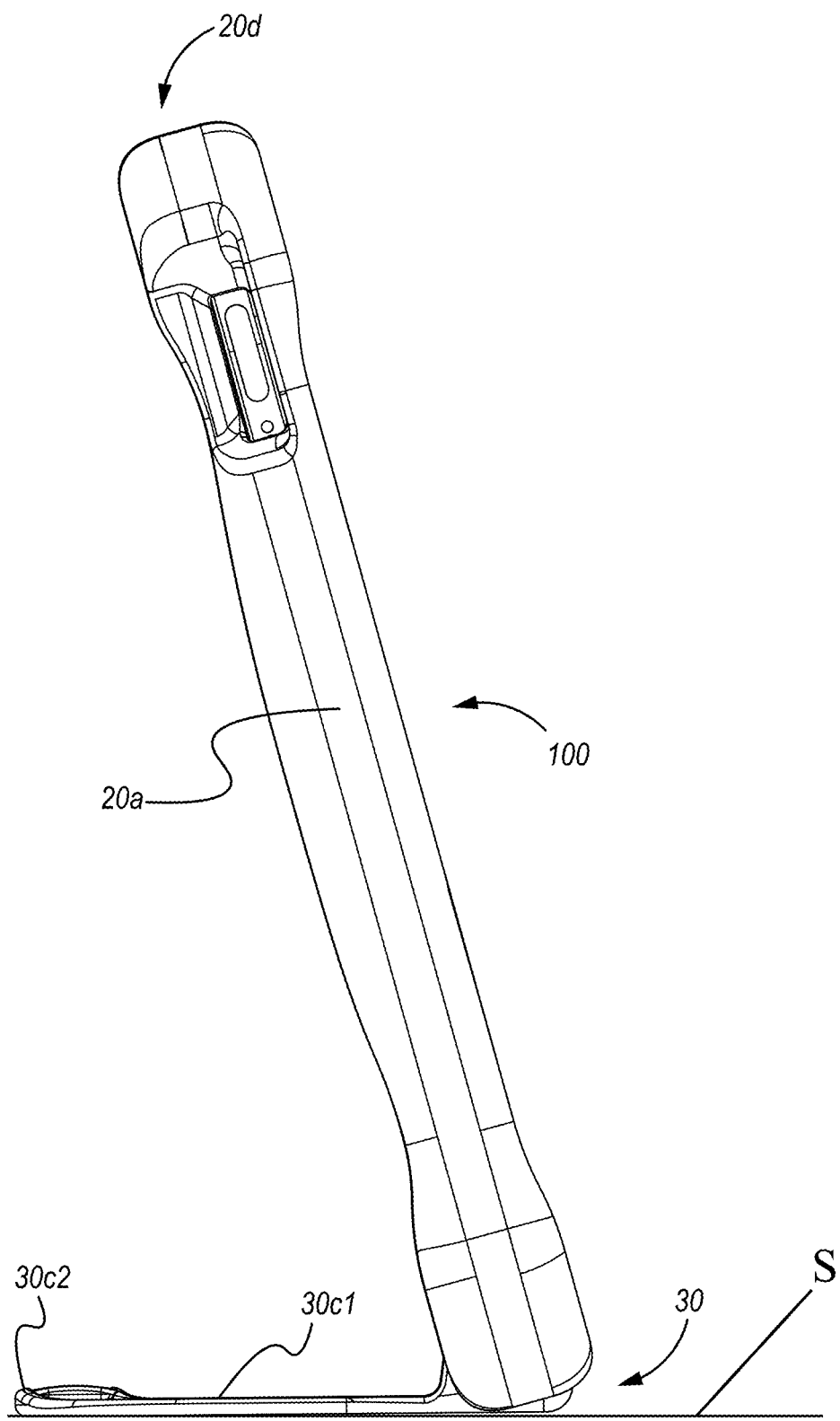
FIG. 32 a side elevational view of the portable electronic computing device case system of FIG. 1 containing the portable electronic computing device of FIG. 1 in open configuration.

Turning to FIG. 32, depicted therein a side elevational view of portable electronic computing device case system 10 containing portable electronic computing device 100 in open configuration.

Figure 33:
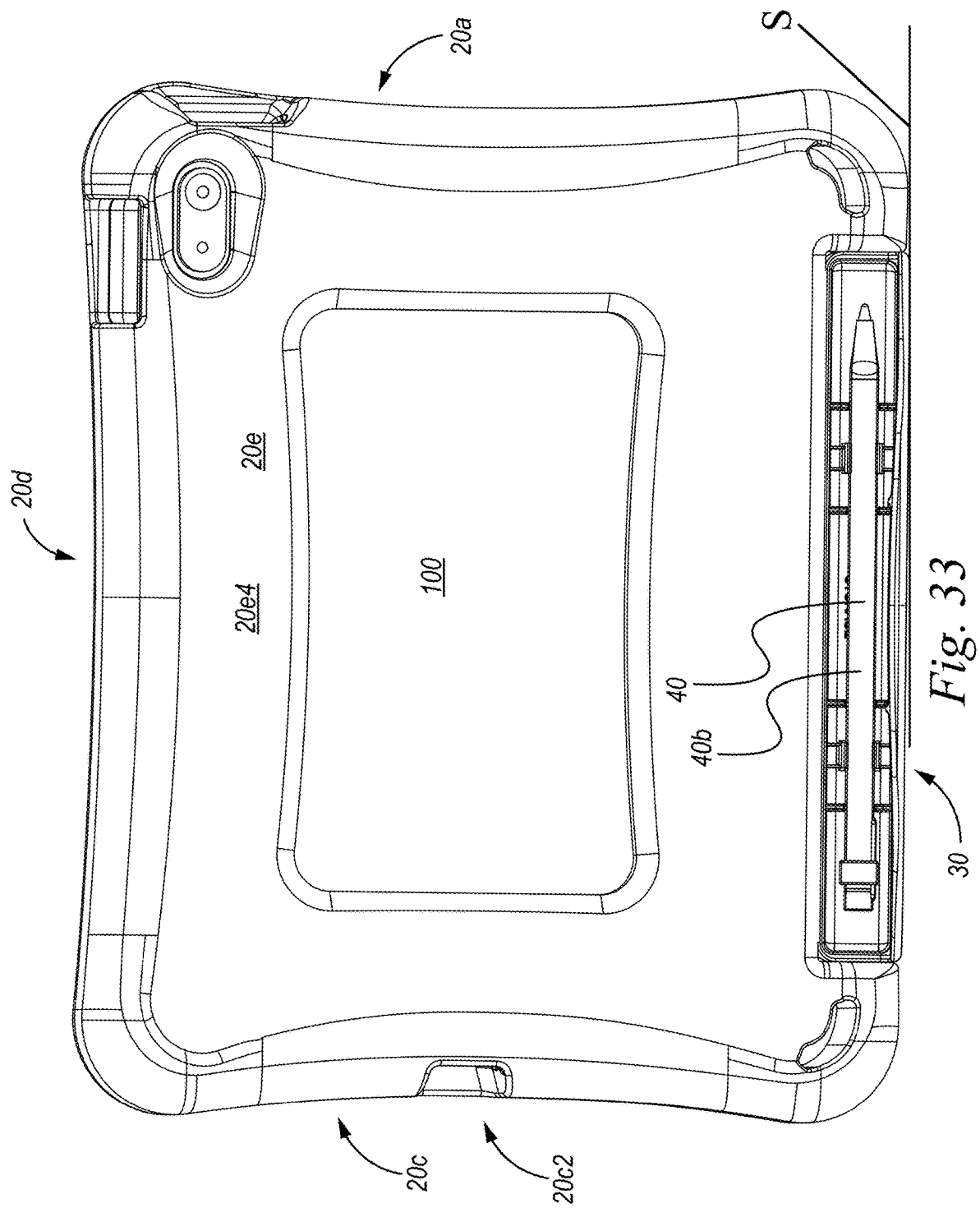
FIG. 33 a rear elevational view of the portable electronic computing device case system of FIG. 1 containing the portable electronic computing device of FIG. 1 in open configuration.

Turning to FIG. 33, depicted therein a rear elevational view portable electronic computing device case system 10 containing portable electronic computing device 100 in open configuration.

Figure 34:
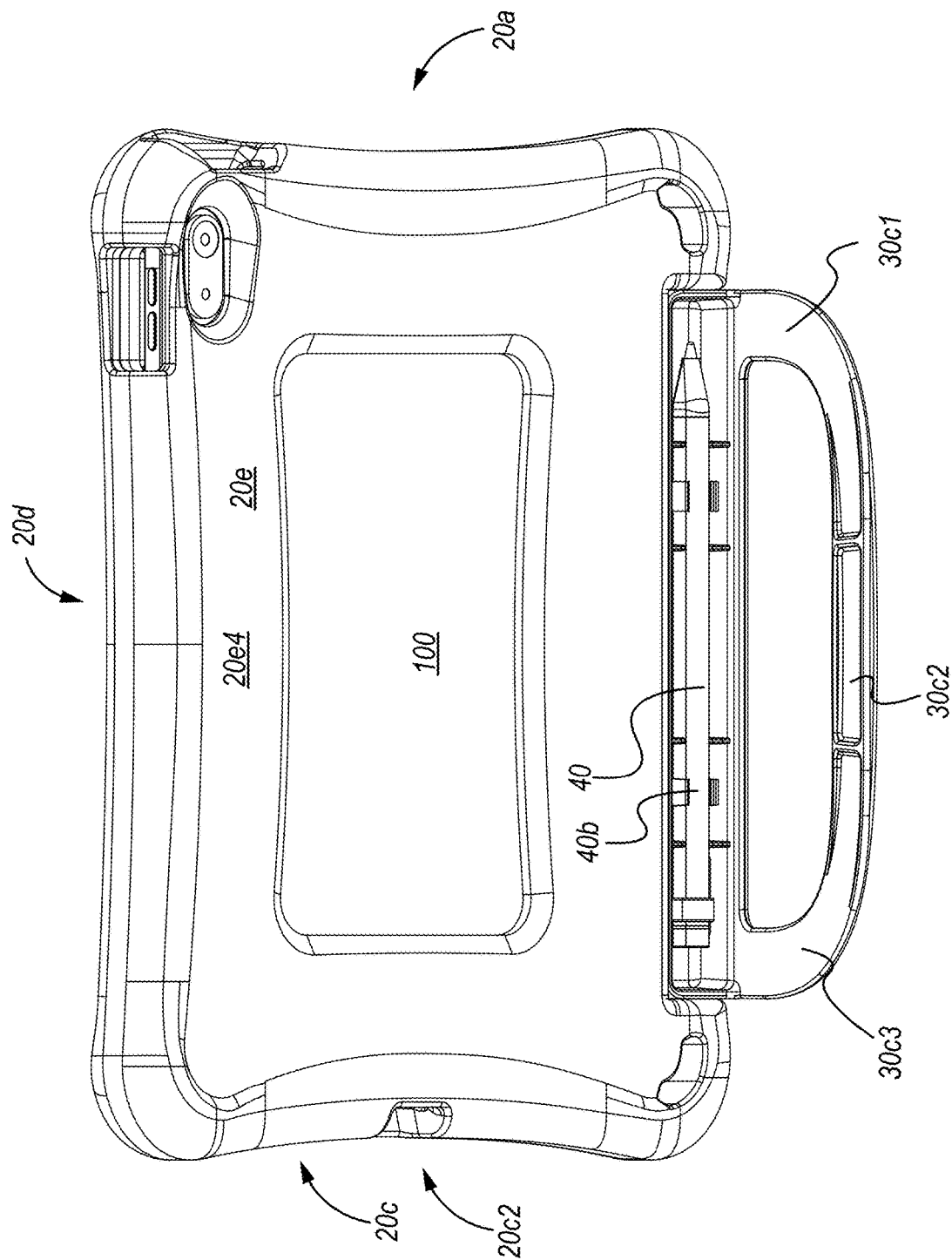
FIG. 34 a rear perspective view of the portable electronic computing device case system of FIG. 1 containing the portable electronic computing device of FIG. 1 in open configuration.

Turning to FIG. 34, depicted therein a rear perspective view of portable electronic computing device case system 10 containing portable electronic computing device 100 in open configuration.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case system for a portable electronic device and a stylus device, the system comprising: (I) a case assembly including (A) a base, (B) a first side extending from the base, (C) a second side extending from the base, and at least a portion of the second side extending perpendicular to at least a portion of the first side, (D) a third side extending from the base and at least a portion of the third side extending perpendicular to at least a portion of the second side, and (E) a fourth side extending from the base and at least a portion of the fourth side extending perpendicular to at least a portion of the first side; and (II) a stand assembly including (A) an elongated member having an elongated cavity, and (B) a base extending from the elongated member, wherein the stand assembly is rotatably couplable with the case assembly, wherein when the stand assembly is rotatably coupled with the case assembly, the stand assembly is rotatable between at least a first rotational position and a second rotational position, wherein the elongated cavity is covered by the case assembly when the stand assembly is in the first rotational position, and wherein the elongated cavity is at least partially uncovered from the case assembly when the stand assembly is in the second rotational position, wherein the first side of the case assembly includes an elongated recess with opposing first and second sides, wherein the elongated member of the stand assembly has first and second ends, wherein the first end of the elongated member of the stand assembly is rotatably coupled with the first side of the elongated recess of the case assembly, and wherein the second end of the elongated member of the stand assembly is rotatably coupled with the second side of the elongated recess of the case assembly.

2. The system of claim 1
   wherein a first frictional resistance is between at least a portion of the case assembly and the stand assembly when the stand assembly is between the first rotational position and the second rotational position, and
   wherein the first frictional resistance resists rotational movement by the stand assembly between the first rotational position and the second rotational position of the stand assembly.

3. The system of claim 2
   wherein the first frictional resistance is between at least a portion of the elongated member of the stand assembly and at least a portion of the first side of the case assembly.

4. The system of claim 1
wherein the elongated member of the stand assembly includes first and second peg portions extending from the first and second ends of the elongated member, respectively,
wherein the first and second sides of the elongated recess includes first and second apertures, respectively,
wherein the first peg portion of the elongated member is rotatably couplable with the first aperture of the first side of the elongated recess, and
wherein the second peg portion of the elongated member is rotatably couplable with the second aperture of the first side of the elongated recess.

5. A case system for a portable electronic device and a stylus device, the system comprising:
(I) a case assembly including
  (A) a base,
  (B) a first side extending from the base,
  (C) a second side extending from the base, and at least a portion of the second side extending perpendicular to at least a portion of the first side,
  (D) a third side extending from the base and at least a portion of the third side extending perpendicular to at least a portion of the second side, and
  (E) a fourth side extending from the base and at least a portion of the fourth side extending perpendicular to at least a portion of the first side; and
(II) a stand assembly including
  (A) an elongated member having an elongated cavity, and
  (B) a base extending from the elongated member,
  wherein the stand assembly is rotatably couplable with the case assembly,
  wherein when the stand assembly is rotatably coupled with the case assembly, the stand assembly is rotatable between at least a first rotational position and a second rotational position,
  wherein the elongated cavity is covered by the case assembly when the stand assembly is in the first rotational position, and
  wherein the elongated cavity is at least partially uncovered from the case assembly when the stand assembly is in the second rotational position,
  wherein the base of the stand assembly includes first and second flat surface portions,
  wherein the base of the stand assembly includes an aperture having a perimeter with first and second portions,
  wherein the first flat surface portion extends from the first and second ends of the elongated member along the elongated member and along the first portion of the perimeter, and
  wherein the second first flat surface portion extends from the first and second ends of the elongated member along the second portion of the perimeter of the aperture.

6. A case system for a portable electronic device and a stylus device, the system comprising:
(I) a case assembly including
  (A) a base,
  (B) a first side extending from the base,
  (C) a second side extending from the base, and at least a portion of the second side extending perpendicular to at least a portion of the first side,
  (D) a third side extending from the base and at least a portion of the third side extending perpendicular to at least a portion of the second side, and
  (E) a fourth side extending from the base and at least a portion of the fourth side extending perpendicular to at least a portion of the first side; and
(II) a stand assembly including
  (A) an elongated member having an elongated cavity, and
  (B) a base extending from the elongated member,
  wherein the stand assembly is rotatably couplable with the case assembly,
  wherein when the stand assembly is rotatably coupled with the case assembly, the stand assembly is rotatable between at least a first rotational position and a second rotational position,
  wherein the elongated cavity is covered by the case assembly when the stand assembly is in the first rotational position, and
  wherein the elongated cavity is at least partially uncovered from the case assembly when the stand assembly is in the second rotational position,
  wherein the elongated member includes a plurality of supports that are shaped and positioned in the elongated cavity to couple with the stylus device.

7. The system of claim 6
wherein the plurality of supports are shaped to couple with the stylus device as a non-cylindrical stylus device.

8. The system of claim 6
wherein the plurality of supports include a first type having at least one groove.

9. The system of claim 6
wherein the plurality of supports include a second type having at least one pad.

10. A case system for a portable electronic device and a stylus device, the system comprising:
(I) a case assembly including
  (A) a base,
  (B) a first side extending from the base,
  (C) a second side extending from the base, and at least a portion of the second side extending perpendicular to at least a portion of the first side,
  (D) a third side extending from the base and at least a portion of the third side extending perpendicular to at least a portion of the second side, and
  (E) a fourth side extending from the base and at least a portion of the fourth side extending perpendicular to at least a portion of the first side; and
(II) a stand assembly including
  (A) an elongated member having an elongated cavity, and
  (B) a base extending from the elongated member,
  wherein the stand assembly is rotatably couplable with the case assembly,
  wherein when the stand assembly is rotatably coupled with the case assembly, the stand assembly is rotatable between at least a first rotational position and a second rotational position,
  wherein the elongated cavity is covered by the case assembly when the stand assembly is in the first rotational position, and
  wherein the elongated cavity is at least partially uncovered from the case assembly when the stand assembly is in the second rotational position,
  wherein the elongated cavity of the elongated member of the stand assembly includes a floor, and
  wherein the floor includes an indicia.

11. The system of claim 10 wherein the base of the stand assembly is adjacent to an exterior portion of the base of the case assembly when the stand assembly is in the first rotational position.

12. The system of claim 10 wherein the base of the stand assembly extends at an angle greater than zero but less than ninety degrees relative to the base of the case assembly when the stand assembly is in the second rotational position.

13. The system of claim 10 wherein the base, the first side, the second side, the third side, and the fourth side of the case assembly include interior portions couplable with the portable electronic device.

14. A case system for a portable electronic device and a stylus device, the system comprising:
(I) a case assembly including
  (A) a base,
  (B) a first side extending from the base,
  (C) a second side extending from the base, and at least a portion of the second side extending perpendicular to at least a portion of the first side,
  (D) a third side extending from the base and at least a portion of the third side extending perpendicular to at least a portion of the second side, and
  (E) a fourth side extending from the base and at least a portion of the fourth side extending perpendicular to at least a portion of the first side; and
(II) a stand assembly including
  (A) an elongated member having an elongated cavity, and
  (B) a base extending from the elongated member,
  wherein the stand assembly is rotatably couplable with the case assembly,
  wherein when the stand assembly is rotatably coupled with the case assembly, the stand assembly is rotatable between at least a first rotational position and a second rotational position,
  wherein the elongated cavity is covered by the case assembly when the stand assembly is in the first rotational position,
  wherein the elongated cavity is at least partially uncovered from the case assembly when the stand assembly is in the second rotational position, and
  wherein the elongated cavity includes a plurality of supports to couple with the stylus device.

15. The system of claim 14 wherein the base of the stand assembly is adjacent to an exterior portion of the base of the case assembly when the stand assembly is in the first rotational position.

16. The system of claim 14 wherein the base of the stand assembly extends at an angle greater than zero but less than ninety degrees relative to the base of the case assembly when the stand assembly is in the second rotational position.

* * * * *